(12) United States Patent
Okuhara et al.

(10) Patent No.: US 10,632,960 B2
(45) Date of Patent: Apr. 28, 2020

(54) FOLDED BODY OF HEAD PROTECTION AIRBAG

(71) Applicant: TOYODA GOSEI CO., LTD., Kiyosu-shi, Aichi-ken (JP)

(72) Inventors: Masaaki Okuhara, Kiyosu (JP); Shinji Hayashi, Kiyosu (JP); Takashi Iida, Kiyosu (JP)

(73) Assignee: TOYODA GOSEI CO., LTD., Aichi-pref (JP)

( * ) Notice: Subject to any disclaimer, the term of this patent is extended or adjusted under 35 U.S.C. 154(b) by 1 day.

(21) Appl. No.: 16/053,907

(22) Filed: Aug. 3, 2018

(65) Prior Publication Data

US 2019/0061672 A1 Feb. 28, 2019

(30) Foreign Application Priority Data

Aug. 24, 2017 (JP) ................................. 2017-161666

(51) Int. Cl.
| | | |
|---|---|---|
| *B60R 21/213* | (2011.01) | |
| *B60R 21/237* | (2006.01) | |
| *B60R 21/232* | (2011.01) | |
| *B60R 21/201* | (2011.01) | |

(52) U.S. Cl.
CPC .......... *B60R 21/237* (2013.01); *B60R 21/213* (2013.01); *B60R 21/232* (2013.01); *B60R 21/201* (2013.01); *B60R 2021/2375* (2013.01)

(58) Field of Classification Search
CPC ... B60R 21/237; B60R 21/213; B60R 21/232; B60R 21/201
USPC ....................................................... 280/743
See application file for complete search history.

(56) References Cited

U.S. PATENT DOCUMENTS

| | | | |
|---|---|---|---|
| 6,899,350 B2 * | 5/2005 | Bakhsh ................ | B60R 21/232 280/730.2 |
| 2007/0126221 A1 * | 6/2007 | Yoshida ................ | B60R 21/201 280/743.1 |
| 2011/0101658 A1 * | 5/2011 | Konishi ................ | B60R 21/213 280/730.2 |
| 2011/0291393 A1 * | 12/2011 | Nakamura ............ | B60R 21/213 280/730.2 |
| 2012/0139215 A1 * | 6/2012 | Heuschmid ........... | B60R 21/233 280/730.2 |
| 2012/0256402 A1 * | 10/2012 | Kato ..................... | B60R 21/213 280/730.2 |

(Continued)

FOREIGN PATENT DOCUMENTS

| | | |
|---|---|---|
| JP | 2013-514233 A | 4/2013 |
| WO | 2012/147490 A1 | 11/2012 |

*Primary Examiner* — Paul N Dickson
*Assistant Examiner* — Hilary L Johns
(74) *Attorney, Agent, or Firm* — Posz Law Group, PLC

(57) ABSTRACT

A folded body of a head protection airbag includes a compression section, and a non-compression section. The airbag includes a shield inflation section that covers the vehicle interior side of a window at a time of inflation completion. The shield inflation section includes: a primary development area developed and inflated in an initial stage of an inflow of the inflation gas; and a secondary development area disposed on a side of one end of the airbag in the front-rear direction so as to be inflatable by following development and inflation of the primary development area. The secondary development area is disposed in the compression section and the primary development area is disposed in the non-compression section.

5 Claims, 18 Drawing Sheets

(56) References Cited

U.S. PATENT DOCUMENTS

| | | | |
|---|---|---|---|
| 2012/0267880 A1* | 10/2012 | Frisk | B60R 21/232 |
| | | | 280/730.2 |
| 2012/0286500 A1* | 11/2012 | Wiik | B60R 21/213 |
| | | | 280/730.2 |
| 2013/0087999 A1* | 4/2013 | Konishi | B60R 21/201 |
| | | | 280/743.1 |
| 2014/0054879 A1 | 2/2014 | Taguchi et al. | |
| 2014/0110923 A1* | 4/2014 | Maita | B60R 21/213 |
| | | | 280/730.2 |
| 2014/0265270 A1* | 9/2014 | Wang | B60R 21/237 |
| | | | 280/730.2 |
| 2014/0306431 A1* | 10/2014 | Baumbach | B60R 21/237 |
| | | | 280/728.2 |
| 2015/0084316 A1* | 3/2015 | Okuhara | B60R 21/2338 |
| | | | 280/729 |
| 2015/0115582 A1* | 4/2015 | Ikenohata | B60R 21/237 |
| | | | 280/730.2 |
| 2015/0145234 A1* | 5/2015 | Wang | B60R 21/232 |
| | | | 280/729 |
| 2016/0001732 A1* | 1/2016 | Asada | B60R 21/232 |
| | | | 280/729 |
| 2017/0182967 A1* | 6/2017 | Suzuki | B60R 21/213 |
| 2018/0208146 A1* | 7/2018 | Azuma | B60R 21/232 |
| 2018/0236965 A1* | 8/2018 | Fischer | B60R 21/237 |
| 2019/0061669 A1* | 2/2019 | Hayashi | B60R 21/232 |

* cited by examiner

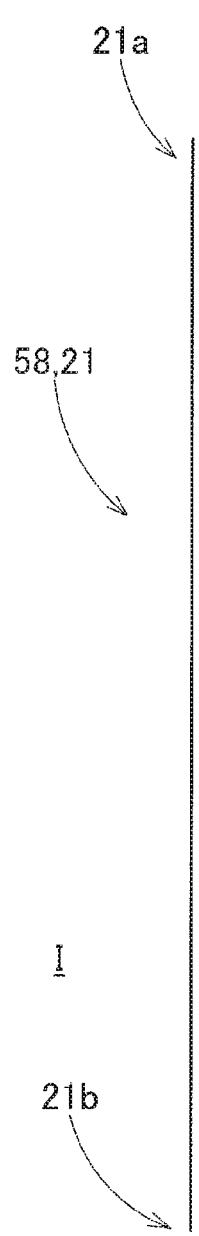
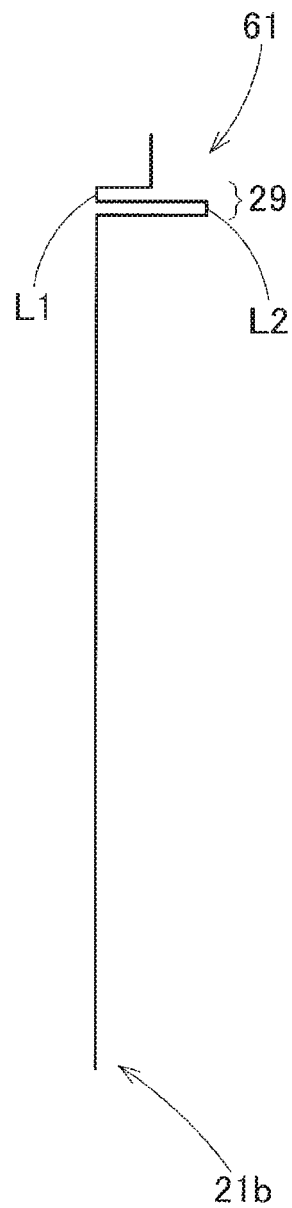
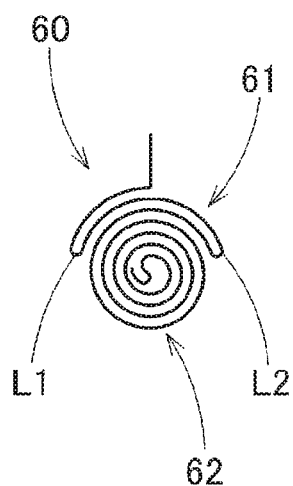

Fig.5A
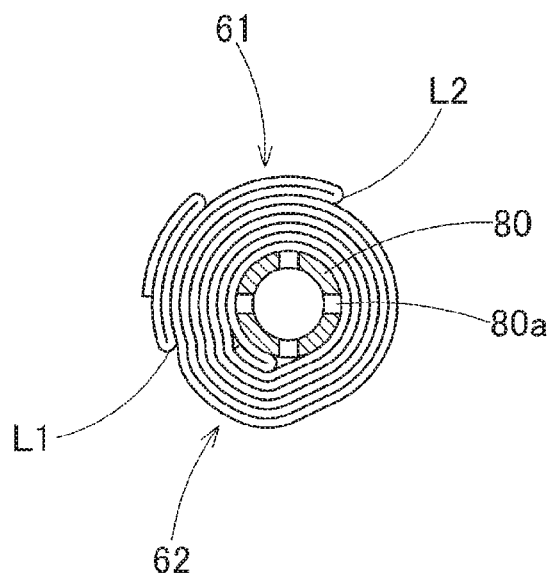
Fig.5B
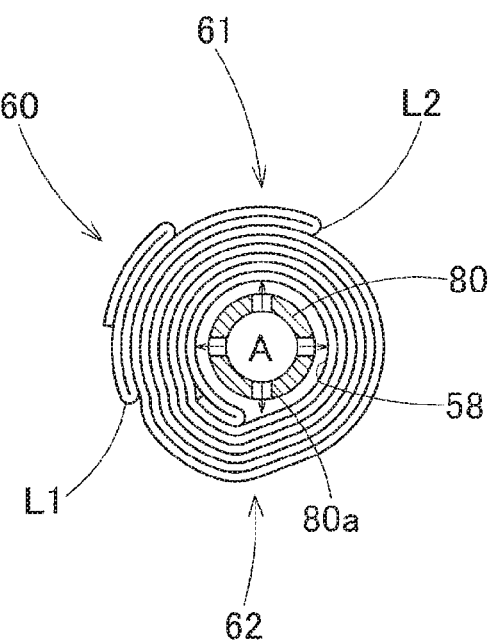

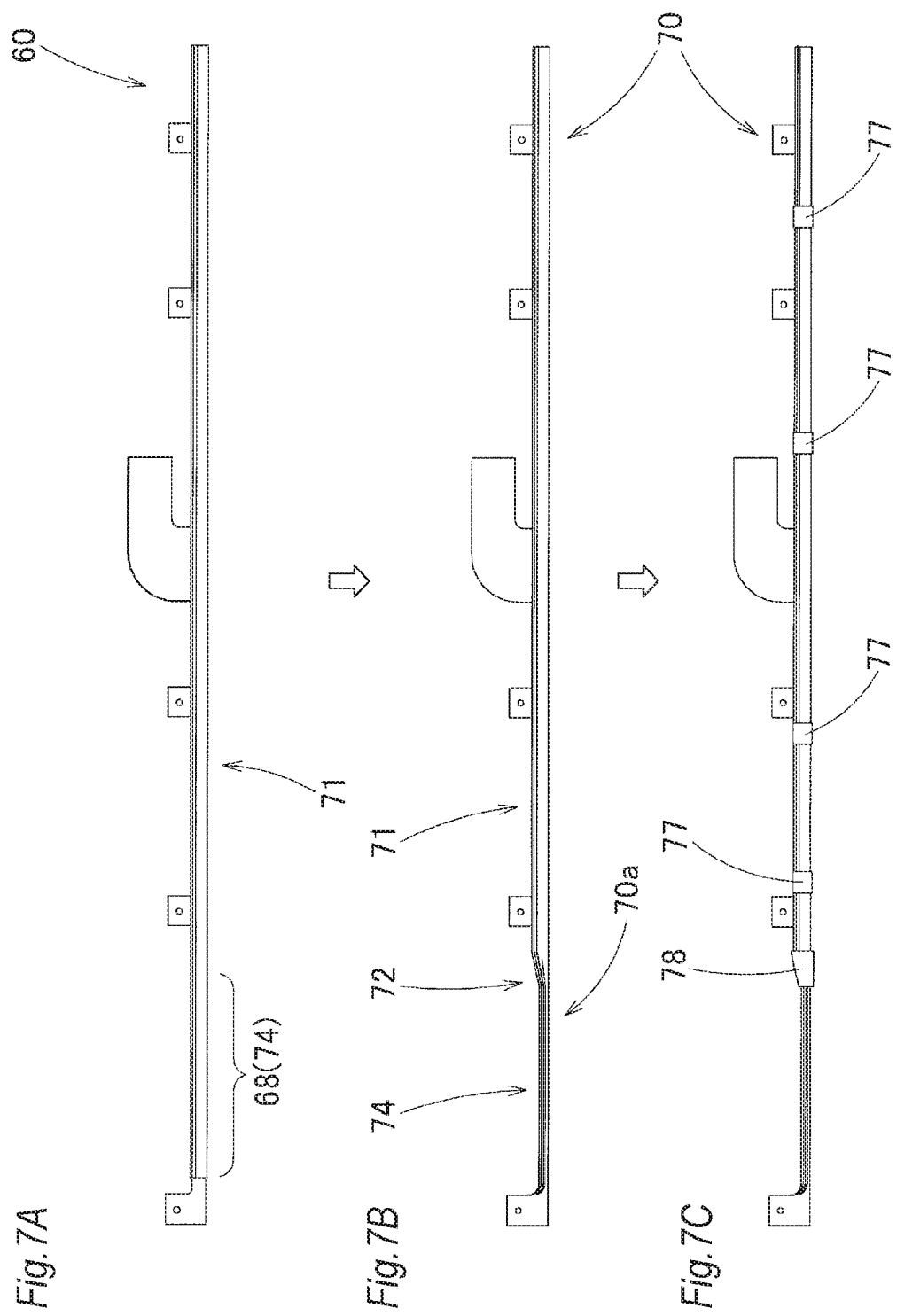

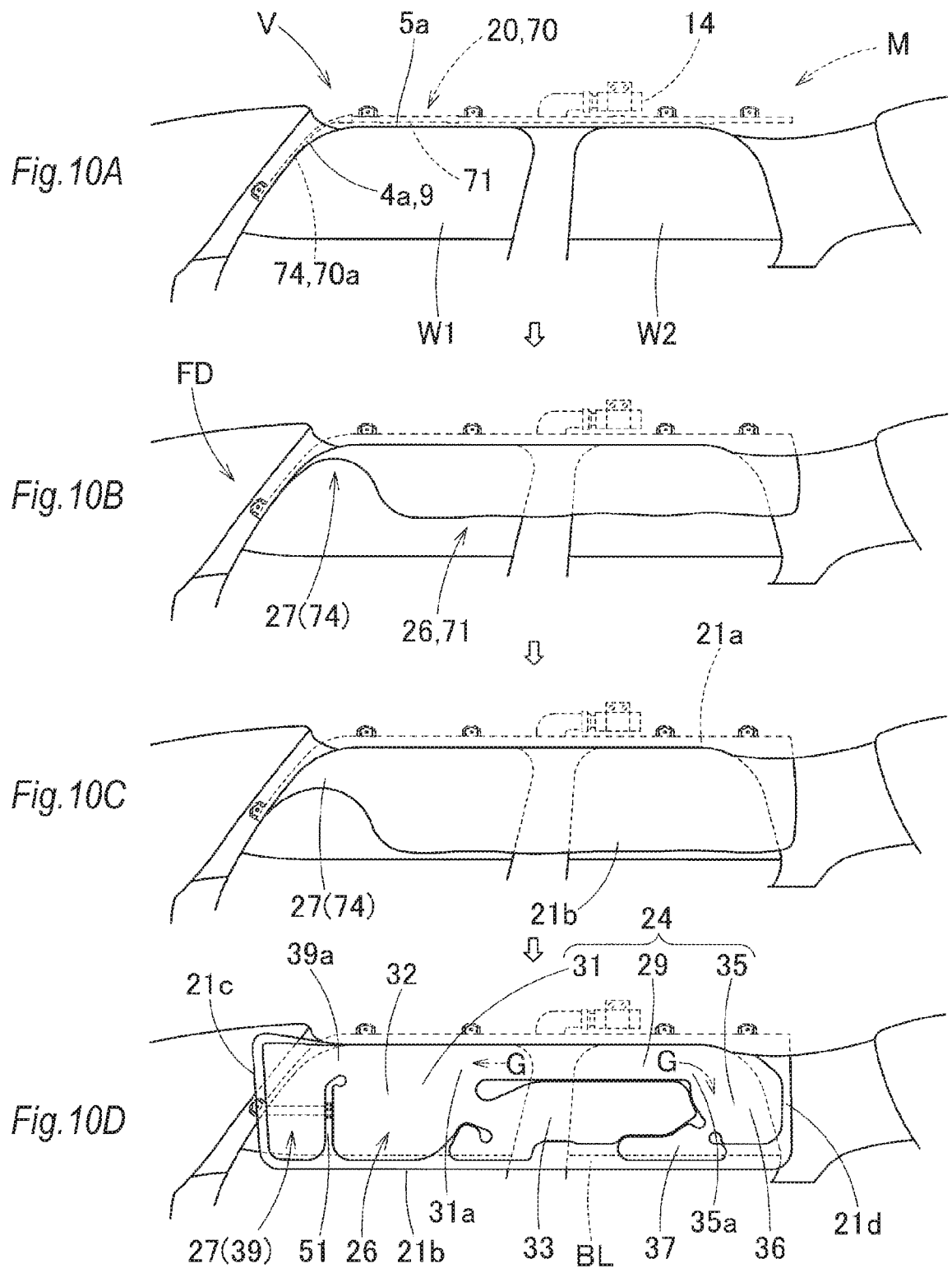

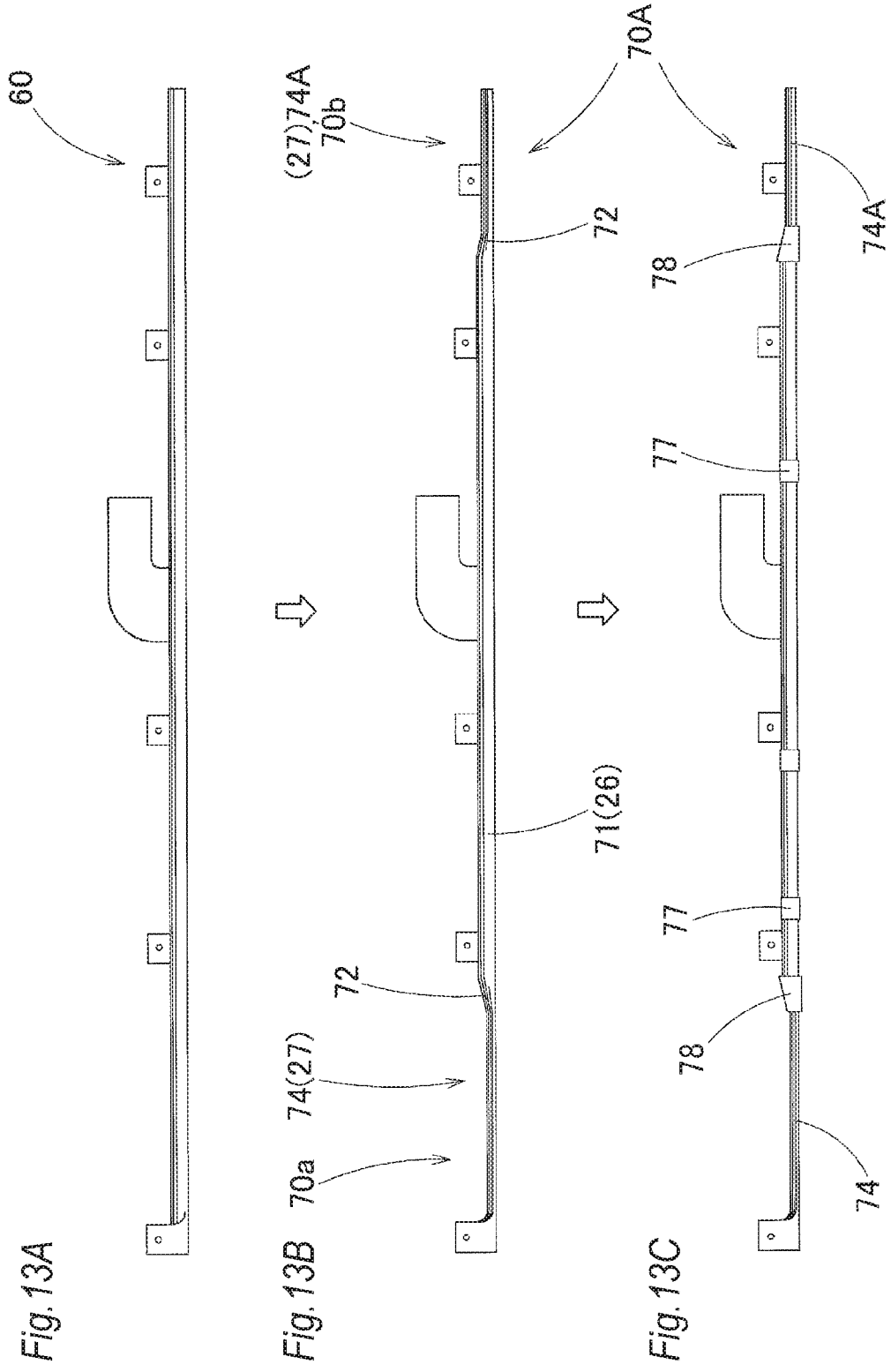

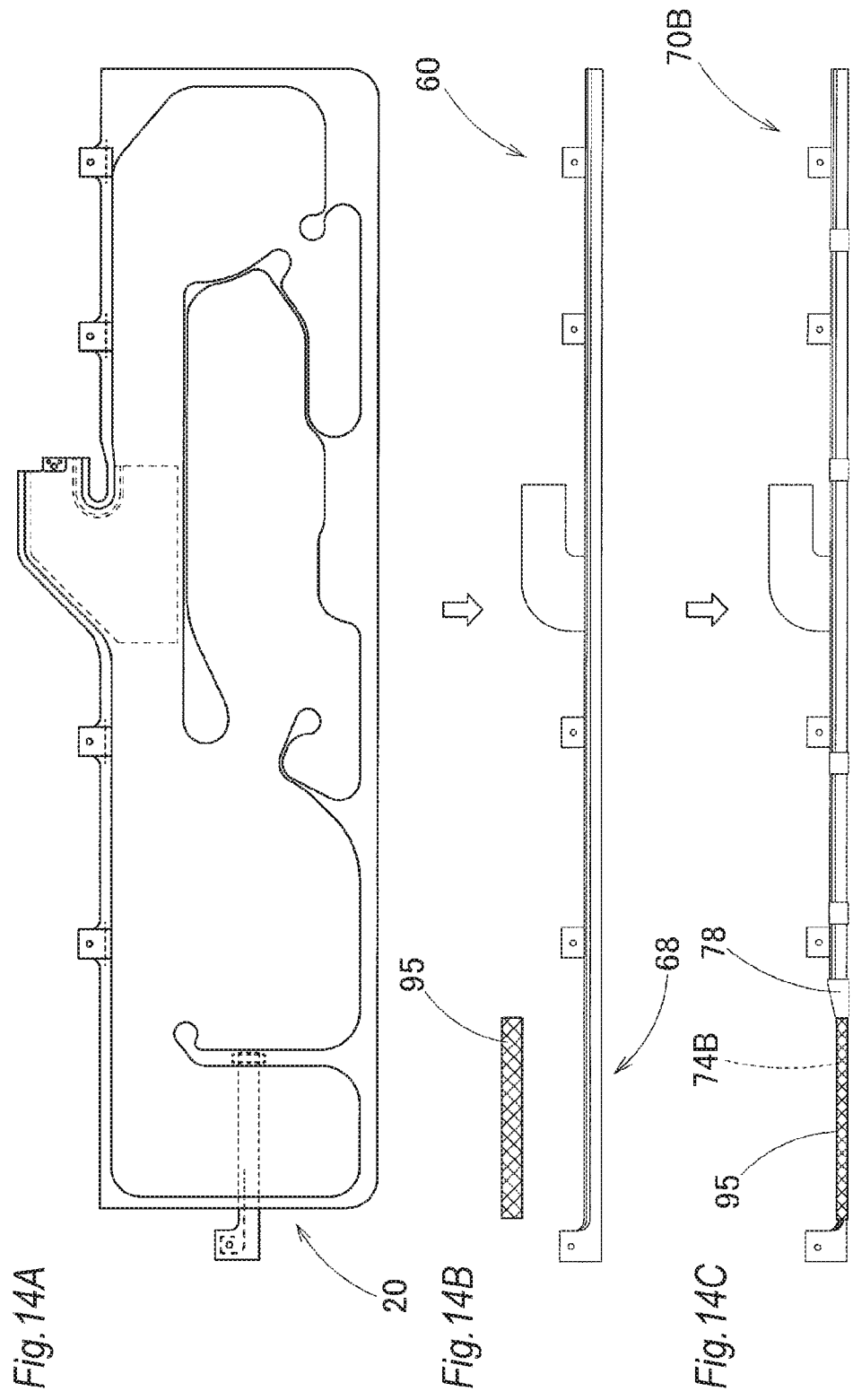

FOLDED BODY OF HEAD PROTECTION AIRBAG

CROSS-REFERENCE TO RELATED APPLICATION(S)

This application is based upon and claims the benefit of priority from prior Japanese patent application No. 2017-161666, filed on Aug. 24, 2017, the entire contents of which are incorporated herein by reference.

BACKGROUND

1. Technical Field

The present invention relates to a folded body of a head protection airbag formed by folding a head protection airbag, the airbag being inflatable so as to cover the vehicle interior side of the window of a vehicle by making inflation gas flow thereinto, from a flatly developed state so that the lower edge side of the airbag is brought close to the upper edge side thereof and so that the airbag can be stored on the upper edge sides of the windows.

2. Background Art

In a head protection airbag of a head protection airbag device, a compression section is sometimes provided in which a hollow portion generated in the center of the folded body thereof having been folded in a spiral shape is compressed so as to be crushed so that the airbag can be stored in a restricted space inside a front pillar section (for example, refer to WO2012/147490).

Furthermore, in a head protection airbag, the folded body thereof folded in a spiral shape is sometimes crushed into a flat state (for example, refer to JP-T-2013-514233).

However, in the related-art folded bodies, the compression section is partially disposed in a portion to be stored inside the front pillar section or the compression section is simply disposed over the entire length; that is to say, the compression section is not disposed in association with the development state of the airbag.

SUMMARY

The present invention is made to solve the above-mentioned problems and is intended to provide a folded body of a head protection airbag in which a compression section capable of being stored compact can be disposed while suppressing the influence on the development state of the airbag.

According to an aspect of the invention, there is provided a folded body of a head protection airbag, formed by folding the head protection airbag, the airbag being inflatable so as to cover a vehicle interior side of a window of a vehicle by making inflation gas flow thereinto, from a flatly developed state into a nearly rod shape along a front-rear direction so that a lower edge side of the airbag is brought close to an upper edge side thereof and so that the airbag can be stored on an upper edge side of the window, the folded body comprising: a compression section that is disposed on an end section side and that is folded and then compressed so as to have a small cross-sectional shape, and a non-compression section that is disposed so as to continue to the compression section and that is folded but not compressed after being folded, wherein the airbag includes a shield inflation section that covers the vehicle interior side of the window at a time of inflation completion, the shield inflation section includes: a primary development area that is developed and inflated in an initial stage of an inflow of the inflation gas; and a secondary development area that is disposed on a side of one end of the airbag in the front-rear direction so as to be inflatable by following development and inflation of the primary development area, and the secondary development area is disposed in the compression section and the primary development area is disposed in the non-compression section.

BRIEF DESCRIPTION OF THE DRAWINGS

FIGS. 3A to 3C are schematic views illustrating a process for folding the airbag according to the embodiment;

FIGS. 5A and 5B are schematic views illustrating the state in which the winding core is removed from the roll-folded airbag;

FIGS. 7A to 7C are views showing the state in which a cover member and folding collapse preventing members are wound after the folded body is formed by folding the airbag according to the embodiment;

FIGS. 10A to 10D are schematic front views sequentially illustrating the operation of the head protection airbag device using the folded body according to the embodiment:

FIGS. 13A to 13C are views showing the states in which the cover members and the folding collapse preventing members are wound around a folded body according to a modification of the embodiment;

FIGS. 14A to 14C are views showing the states in which the cover member and the folding collapse preventing members are wound around a folded body according to another modification of the embodiment:

DETAILED DESCRIPTION OF EXEMPLARY EMBODIMENTS

Figure 1:
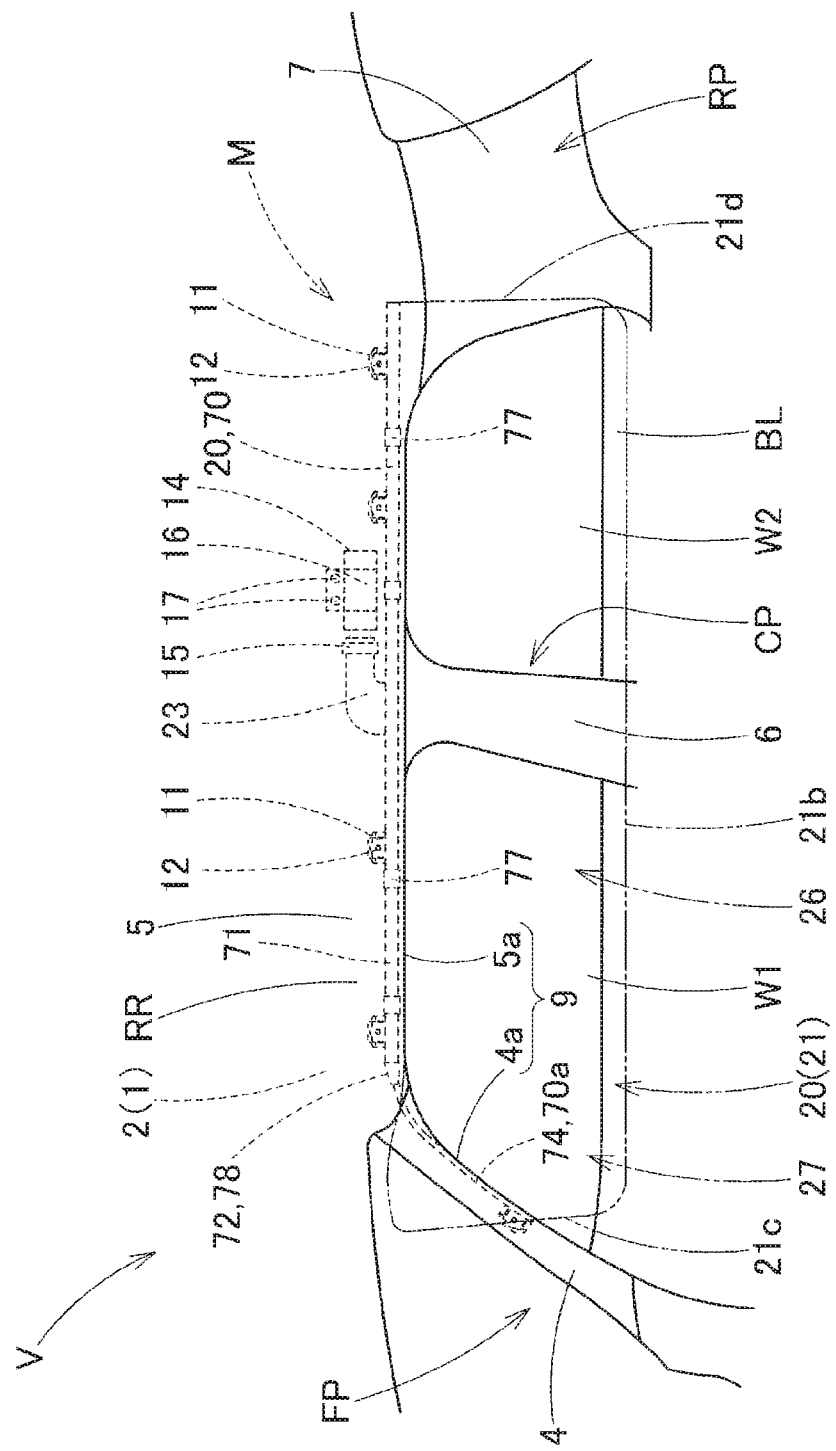
FIG. 1 is a schematic front view showing a head protection airbag device that uses a folded body of a head protection airbag according to an embodiment of the present invention, as viewed from the interior side of a vehicle.

An embodiment according to the present invention will be described below on the basis of the accompanying drawings. A folded body 70 of a head protection airbag 20 (hereafter appropriately simply referred to as an airbag) according to the embodiment is used for a head protection airbag device M shown in FIG. 1. The head protection airbag device M is, as shown in FIG. 1, composed of the airbag 20, an inflator 14, installation brackets 11 and 16, and an airbag cover 9. On the upper edge sides of the windows W1 and W2 on the vehicle interior side of a vehicle V, the airbag 20 is stored as the folded body 70 in the area from the side of the lower edge 4a of a front pillar section FP to the upper area of a rear pillar section RP via the side of the lower edge 5a of a roof side rail section RR as shown in FIG. 1. In the embodiment, the airbag 20 is configured so as to be able to protect the heads of occupants at the time of a side collision or at the time of a rollover accident of the vehicle V. Furthermore, the windows W1 and W2 are disposed on the sides of the front seat and the rear seat, respectively, in the vehicle V.

The airbag cover 9 is composed of a front pillar garnish 4 disposed on the front pillar section FP, a roof head lining 5 disposed on the roof side rail section RR, and the lower edges 4a and 5a thereof. Each of the front pillar garnish 4 and the roof head lining 5 is made of a synthetic resin and installed and fixed on the vehicle interior side of an inner panel 2 on the side of a body (vehicle body) 1. Moreover, the airbag cover 9 is disposed so as to cover the vehicle interior side I of the airbag 20 (the folded body 70) that is folded and stored, and is also disposed so as to be able to open toward the vehicle interior side I when pushed by the airbag 20 at the time of development and inflation as shown in FIGS. 11A to 11C and FIGS. 12A to 12C.

The inflator 14 is used to supply inflation gas to the airbag 20, is a cylinder type having a nearly circular cylindrical shape, and is provided with gas discharge ports, not shown, capable of discharging the inflation gas to the tip end side thereof. The tip end side of the inflator 14 including the periphery of the gas discharge ports is inserted into the inflow port section 23, described later, of the airbag 20 and connected to the airbag 20 using a clamp 15 disposed on the outer peripheral side of the inflow port section 23. What's more, the inflator 14 is installed at the position on the inner panel 2 above the window W2 using the installation bracket 16 for holding the inflator 14 and bolts 17 for fixing the installation bracket 16 to the inner panel 2 on the side of the body 1 (see FIG. 1). The inflator 14 is electrically connected to the controller, not shown, of the vehicle V, via lead wires, not shown. When the controller detects a side collision or a rollover accident of the vehicle V, an operation signal from the controller is input to the inflator 14 to operate the inflator 14.

Figure 11A:
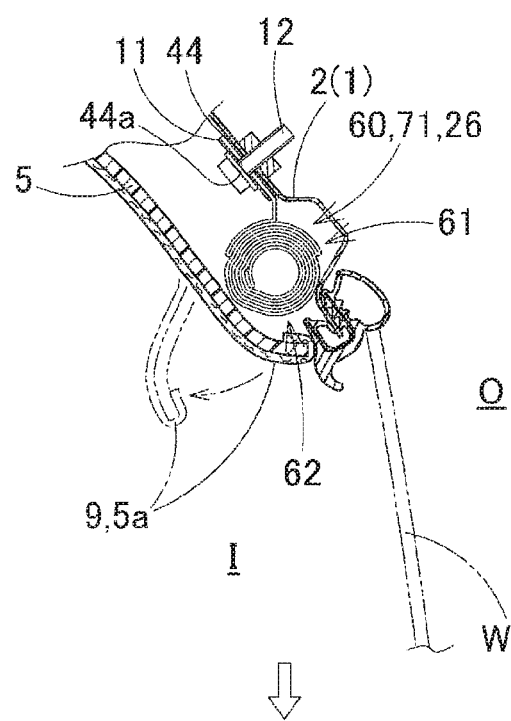
FIGS. 11A to 11C are schematic sectional views sequentially illustrating the operation of the head protection airbag device that uses the folded body according to the embodiment, showing the portion of a primary development area (non-compression section)

Each of the installation brackets 11 is composed of two plates each made of a sheet metal and is installed on each of installation sections 44 and 56, described later, so as to sandwich each of the installation sections 44 and 56 from the front side and the rear side, thereby installing and fixing each of the installation sections 44 and 56 to the inner panel 2 on the side of the vehicle V using bolts 12 (see FIGS. 1, 2 and 11A).

As shown in FIGS. 1, 7B and 10A, the folded body 70 of the airbag 20 is composed of a compression section 74 that is folded and then compressed so as to have a small cross-sectional shape and a non-compression section 71 that is folded but not compressed after being folded. The compression section 74 is disposed on the side of the front end section 70a of the folded body 70, and the non-compression section 71 is disposed over the entire area on the rear side of the compression section 74 in the folded body 70. In the embodiment, the compression section 74 is disposed so as to be covered with the lower edge 4a of the front pillar garnish 4 inside the front pillar section FP and also covered with the lower edge 5a of the roof head lining 5 of the roof side rail section RR in the vicinity of the front pillar section FP. The boundary portion 72 between the compression section 74 and the non-compression section 71 is formed into a tapered shape expanding from the compression section 74 to the side of the non-compression section 71.

Figure 15:
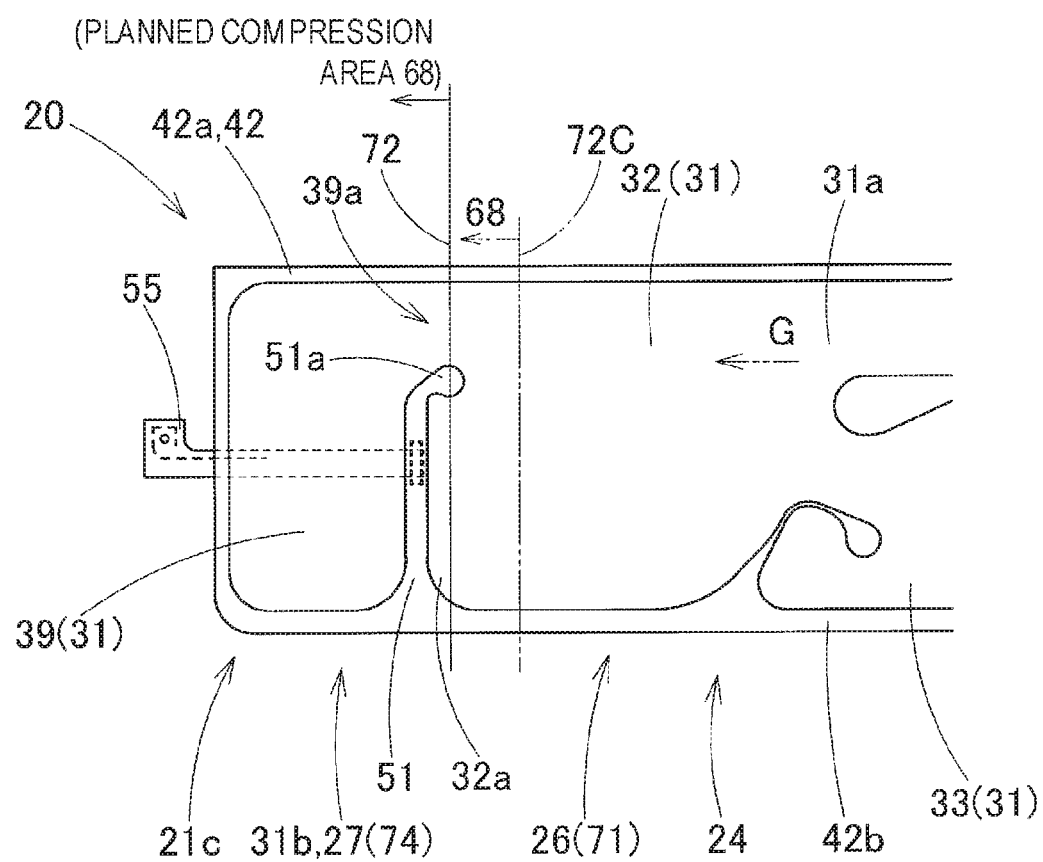
FIG. 15 is a view illustrating the boundary portion between the primary development area and the secondary development area of the airbag according to the embodiment.

In the case of the embodiment, as shown in FIG. 15, the area of the compression section 74 (planned compression area 68) is an area to the side of the front end 21c of the folded body from the area located around the upper end 51a of an end side partition section 51, described later, and being closest to the upper edge 42a of the peripheral section 42 of the folded body. Furthermore, the tapered shape of the boundary portion 72 is a shape generated spontaneously from the compression section 74 to the side of the non-compression section 71.

Figure 2:
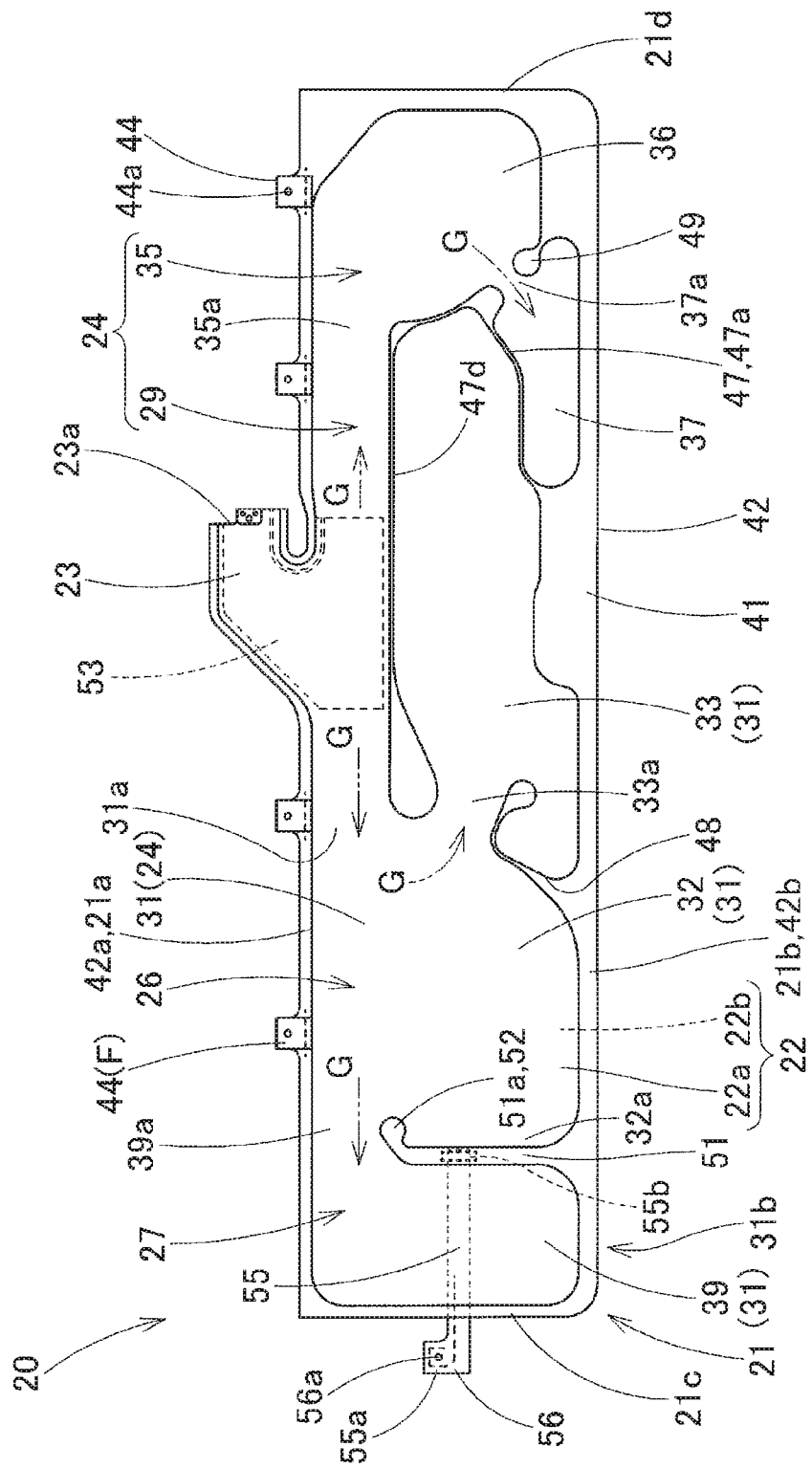
FIG. 2 is a front view showing the head protection airbag formed into the folded body according to the embodiment, the airbag being in a flatly developed state.

As indicated by the two-dot chain line in FIG. 1 and as shown in FIG. 2 and FIGS. 10A to 10D, the airbag 20 that is formed into the folded body 70 is developed from its folded state by making the inflation gas from the inflator 14 flow into the inside of the airbag 20, whereby the airbag 20 is developed and inflated so as to cover the windows W1 and W2 and the pillar garnishes 6 and 7 of the center pillar section CP and the rear pillar section RP. More specifically, the external shape of the airbag 20 at the time of inflation completion is formed into a nearly rectangular plate shape so that the longitudinal direction thereof is nearly aligned with the front-rear direction thereof so as to be able to cover the vehicle interior side ranging from the window W1 to the front side of the rear pillar section RP via the center pillar section CP and the window W2. In the embodiment, as shown in FIGS. 1 and 10D, the lower edge 21b of the folded body at the time of inflation completion is positioned below the belt line BL that is formed by the lower edges of the windows W1 and W2. In the case of the embodiment, as shown in FIG. 2, the airbag 20 is composed of a bag body 21, an inner tube 53 disposed inside the inflow port section 23 of the bag body 21, and a connecting member 55 disposed on the side of the front end 21c of the bag body 21.

In the case of the embodiment, the base cloths 58 for the airbag, constituting the bag body 21, are integrated by hollow weaving the cloths using a polyamide yarn or a polyester yarn. Furthermore, the bag body 21 has a gas inflow section 22 (see FIG. 11C) that is inflated by making inflation gas G flow thereinto so that the vehicle interior side wall section 22a positioned on the vehicle interior side I is separated from the vehicle exterior side wall section 22b positioned on the vehicle exterior side O at the time of inflation completion and a non-inflow section 41 into which the inflation gas G is not made to flow.

The gas inflow section 22 is composed of a shield inflation section 24 that is inflated so as to cover the vehicle interior sides of the windows W1 and W2 and the circular cylindrical inflow port section 23 connected to the inflator 14 so as to supply the inflation gas to the shield inflation section 24. The inflow port section 23 is disposed in the central area in the front-rear direction on the side of the upper edge 21*a* of the bag body 21, and the inner tube 53 for improving heat resistance is disposed therein. In the state in which the inflator 14 is inserted into the inflow port section 23 from the opening 23*a* on the rear end side thereof, the clamp 15 is caulked on the outer peripheral side of the inflow port section 23, whereby the inflow port section 23 is connected to the inflator 14.

The shield inflation section 24 has a plurality (two in the embodiment) of inflation body sections 31 and 35 arranged along the front-rear direction and a gas guide passage 29 disposed above the inflation body sections 31 and 35 on the upper edge side of the shield inflation section 24. The gas guide passage 29 communicates with the inflow port section 23 and is disposed so as to be able to guide the inflation gas G having been made to flow from the inflow port section 23 to the inflation body sections 31 and 35 disposed ahead and behind thereof.

The inflation body section 31 on the front side is composed of a main protection inflation section (front protection inflation section) 32 disposed on the central side in the front-rear direction to cover the vehicle interior side of the portion of the window W1 on the side of the head of the occupant sitting on the front seat, an auxiliary inflation section 33 that is inflated on the rear side of the protection inflation section 32, and an end side inflation section 39 that is inflated on the front side of the protection inflation section 32 disposed on the side of the front end section 31*b* of the inflation body section 31. The protection inflation section 32 is inflated by making the inflation gas G flow thereinto from the supply port 31*a* on the front end side of the gas guide passage 29. The auxiliary inflation section 33 communicates with the protection inflation section 32 via a communication port 33*a* on the front end side thereof and is inflated by making the inflation gas G flow thereinto from the protection inflation section 32 through the communication port 33*a*.

The end side inflation section 39 is partitioned from the protection inflation section 32 by the partition section (end side partition section) 51, described later, and is disposed on the side of the front end section 31*b* of the inflation body section 31 on the front side, that is, on the side of the front end 21*c* of the shield inflation section 24. On the upper side of the end side inflation section 39, an inflow port 39*a* disposed between the upper end 51*a* of the partition section 51 and the upper edge 42*a* of the peripheral edge section 42, described later, is disposed. The end side inflation section 39 is inflated by making the inflation gas G from the protection inflation section 32 of the inflation body section 31 flow thereinto from the inflow port 39*a*. When the occupant sitting on the front seat is moved diagonally forward on the vehicle exterior side O at the time of an offset collision of the vehicle V, for example, the end side inflation section 39 is disposed so as to be able to receive and protect the head of the occupant.

The inflation body section 35 on the rear side is composed of a protection inflation section (rear protection inflation section) 36 that covers the vehicle interior side of the portion of the window W2 on the side of the head of the occupant sitting on the rear seat and an auxiliary inflation section 37 that is inflated on the front lower side of the rear protection inflation section 36. The rear protection inflation section 36 is inflated by making the inflation gas G from the supply port 35*a* on the rear end side of the gas guide passage 29 flow thereinto. The auxiliary inflation section 37 communicates with the rear protection inflation section 36 via the communication port 37*a* provided on the rear side and is inflated by making the inflation gas G from the rear protection inflation section 36 through the communication port 37*a* flow thereinto.

The auxiliary inflation sections 33 and 37 serve as the pressure regulating chambers of the front protection inflation section 32 and the rear protection inflation section 36 and are disposed so that, in the case that the internal pressures in the front protection inflation section 32 and the rear protection inflation section 36 rise abruptly when the protection inflation sections receive the heads of occupants, the inflation gas G can be made to flow from the front protection inflation section 32 and the rear protection inflation section 36 into the auxiliary inflation sections 33 and 37 and so that abrupt increase in internal pressure can be suppressed.

Furthermore, in the case of the embodiment, the area including the gas guide passage 29, the protection inflation sections 32 and 36 in the inflation body sections 31 and 35 and the auxiliary inflation sections 33 and 37 therebetween is set as a primary development area 26 so that the direction of the development is made stable and the windows W1 and W2 are covered quickly at the time when the inflation gas G flows into the airbag 20. Moreover, the side of the front end section 31*b* of the inflation body section 31 on the side of the end side inflation section 39 capable of receiving and protecting the head of the occupant that is moved with a delay is set as a secondary development area 27 serving as the compression section 74 because no problem occurs even if the side of the front end section 31*b* is developed and inflated with a delay, that is, because the side of the front end section 31*b* receives the occupant at the timing delayed from the start of the inflation. More specifically, in the case of the embodiment, the secondary development area 27 serving as the compression section 74 is located on the side of the front end section 31*b* of the inflation body section 31 away from the inflow port 39*a*, and the upper end 51*a* of the partition section 51 is extended upward while being bent slightly rearward. Hence, in reality, the front edge section 32*a* of the front protection inflation section 32 directly under the upper end 51*a* serves as the compression section 74 and is included in the secondary development area 27 instead of the primary development area 26.

The non-inflow section 41 is composed of the peripheral edge section 42 constituting the outer peripheral edge of the gas inflow section 22, the installation sections 44, and partition sections 47, 48, 49 and 51 disposed inside the area of the gas inflow section 22 to partition the inflation portion. In the case of the embodiment, these partition sections 47, 48, 49 and 51 are disposed so as to partially join the vehicle interior side wall section 22*a* and the vehicle exterior side wall section 22*b* of the gas inflow section 22.

In the case of the embodiment, the peripheral edge section 42 is formed so as to join the vehicle interior side wall section 22*a* and the vehicle exterior side wall section 22*b* of the gas inflow section 22 and is disposed so as to entirely surround the circumference of the gas inflow section 22 except for the opening 23*a* on the rear end side of the inflow port section 23. The installation sections 44, plural in number, are portions for installing the side of the upper edge 21*a* of the bag body 21 on the inner panel 2 on the side of the body 1 and are disposed along the front-rear direction so as to protrude upward from the upper edge 42a of the peripheral edge section 42 serving as the side of the upper edge 21a of the bag body 21. In the case of the embodiment, four installation sections 44 in total are disposed, two on the front side of the inflow port section 23 and two on the rear side of the inflow port section 23, and these are provided so as to be joined to the upper edge 42a of the peripheral edge section 42 by sewing separate cloths thereto. Each installation section 44 is provided with an installation hole 44a into which the installation bolt 12 can be inserted. However, each installation section may be formed by performing hollow weaving so as to be integrated with the side of the upper edge 42a of the peripheral edge section 42.

The partition section 47 constitutes a central partition section 47 that is composed of a vertical rod section 47a disposed so as to be curved and extended upward from the central area of the lower edge 42b of the peripheral edge section 42 in the front-rear direction and a horizontal rod section 47b extending forward from the upper end of the vertical rod section 47a. The vertical rod section 47a partitions the auxiliary inflation section 33 of the inflation body section 31 on the front side and the inflation body section 35 (the auxiliary inflation section 37 and the rear protection inflation section 36) on the rear side, and the horizontal rod section 47b forms the lower edge side of the gas guide passage 29 and partitions the auxiliary inflation section 33 and the gas guide passage 29.

The partition section 48 forms the lower edge side of the communication port 33a and extends upward from the lower edge 42b of the peripheral edge section 42, thereby constituting a front lower partition section 48 for partitioning the front protection inflation section 32 and the auxiliary inflation section 33. The partition section 49 forms the lower edge side of the communication port 37a and extends upward from the lower edge 42b of the peripheral edge section 42, thereby constituting a rear lower partition section 49 for partitioning the auxiliary inflation section 37 and the rear protection inflation section 36.

The partition section 51 constitutes an end side partition section 51 for partitioning the end side inflation section 39 and the front protection inflation section 32 and is disposed so as to extend upward from the front side of the lower edge 42b of the peripheral edge section 42. Moreover, the upper end 51a, not reaching the upper edge 42a of the peripheral edge section 42, is disposed so that the inflow port 39a from which the inflation gas G is made to flow into the end side inflation section 39 is provided between the upper end 51a and the upper edge 42a of the peripheral edge section 42.

In the case of the embodiment, the upper end 51a of the end side partition section 51 is disposed on the end section side in the front-rear direction beyond the supply port 31a for supplying the inflation gas G to the inflation body section 31 on the front side in the gas guide passage 29 (that is, on the side of the front end section 31b) so as to change the direction of the flow of the inflation gas G going to the side of the front end section 31b of the inflation body section 31 (more specifically, so as to make the inflation gas G flowing to the side of the front end section 31b of the inflation body section 31 interfere with the upper end 51a of the partition section 51 and so that the flow is branched (changed) to the flow directed to the side of the lower edge 42b of the peripheral edge section 42 and to the flow directed to the inside of the end side inflation section 39 via the inflow port 39a). Hence, the upper end 51a of the end side partition section 51 has a function serving as a gas flow changing throttle section 52.

The connecting member 55 is a member separated from the bag body 21 and made of a flexible sheet material; in the case of the embodiment, the connecting member 55 is formed of a woven cloth made of polyamide yarn, polyester yarn, etc. The side of the base section 55b of the connecting member 55 is joined to the bag body 21, and the side of the tip end 55a thereof is fixed to the side of the body 1 of the vehicle V at the peripheral edge of the window W1 away from the front end 21c of the bag body 21; in the case of the embodiment, the side of the tip end 55a is fixed to the inner panel 2 on the side of the body 1 at the portion of the front pillar section FP. In the embodiment, at the time of inflation completion of the bag body 21, the connecting member 55 is disposed on the vehicle exterior side of the end side inflation section 39, and the side of the base section 55b is sewn (joined) to the portion on the vehicle exterior side of the end side partition section 51 using a sewing thread. The installation section 56 is disposed on the side of the tip end 55a of the connecting member 55. Like the installation sections 44 formed on the bag body 21, the installation section 56 is a portion that is installed on the inner panel 2 using the installation bracket 11 and the installation bolt 12 and is provided with an installation hole 56a into which the installation bolt 12 can be inserted.

Furthermore, in the case of the embodiment, together with the connecting member 55, the area of the end side inflation section 39 of the inflation body section 31 on the side of the front end 21c of the bag body 21 including the portion of the inflow port 39a (more specifically, including the front edge section 32a of the front protection inflation section 32 of the inflation body section 31) is set as the secondary development area 27 and formed in the compression section 74, and still further, the gas guide passage 29, the protection inflation sections 32 and 36 of the inflation body sections 31 and 35 and the auxiliary inflation sections 33 and 37 in the other portions are configured as the non-compression section 71 of the primary development area 26 that is not compressed, whereby the folded body 70 is formed.

Figure 4A:
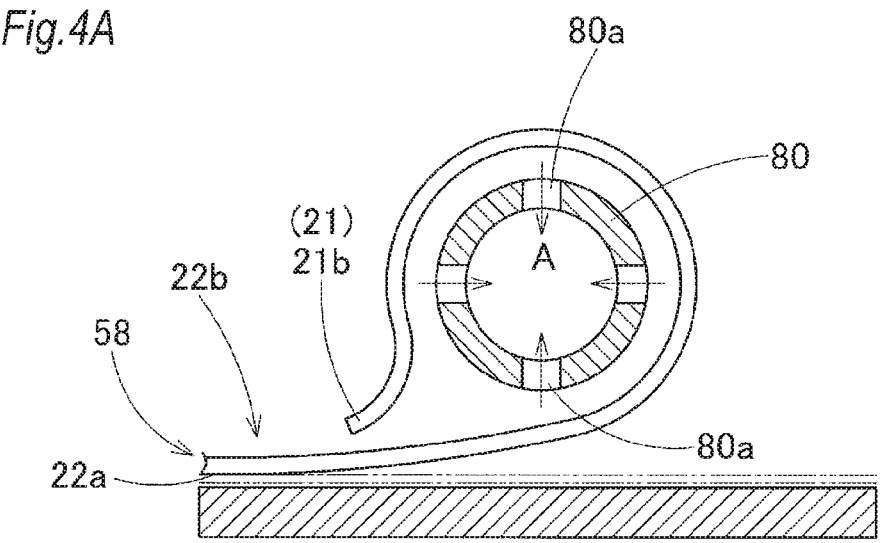
FIGS. 4A and 4B are schematic views illustrating the state in which the airbag according to the embodiment is wound around a winding core at the time when the airbag is folded by roll-folding.
Figure 4B:
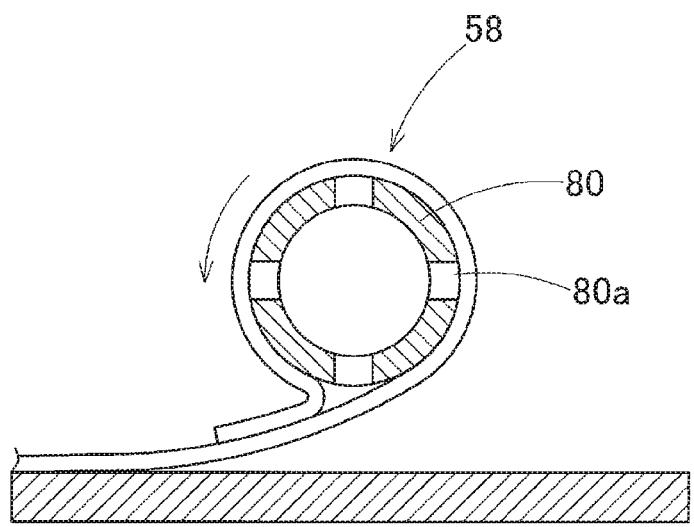

Next, processes for forming the folded body 70 by folding the airbag 20 and by forming the compression section 74 will be described. First, in a process for folding the airbag 20, the base cloths 58 of the bag body 21 being in a flatly developed state so that the vehicle interior side wall section 22a and the vehicle exterior side wall section 22b are placed on each other are folded so as to reduce the width dimension in the up-down direction (so as to bring the side of the lower edge 21b close to the side of the upper edge 21a), thereby forming a bag folded body 60. More specifically, in the embodiment, as shown in FIGS. 3A and 3B, the portion of the gas guide passage 29 on the side of the upper edge 21a of the bag body 21 is folded along two folding lines L1 and L2 disposed approximately along the front-rear direction so as to be folded into a bellows-like shape, and then, in the state in which the vehicle interior side wall section 22a and the vehicle exterior side wall section 22b are placed on each other, the lower area of the gas guide passage 29 is folded by performing roll-folding so that the lower edge 21b is rolled toward the vehicle exterior side O (see FIGS. 3A to 3C). The folding process is described further in detail. The bag body 21 being flattened is set on the mounting table of a folding machine, not shown. While the two folding lines L1 and L2 oriented approximately along the front-rear direction are formed at the portion of the gas guide passage 29 using a folding plate, not shown, a bellows-folded portion 61 is formed by folding the bag body at the portions of the folding lines L and L2. And then, almost at the same time as the formation of this bellows-folded portion 61, a roll-folded portion 62 is formed. In the embodiment, as shown in FIG. 4A, the roll-folded portion 62 is formed using a long cylindrical winding core 80 having numerous intake ports 80a capable of taking in air A. More specifically, the winding core 80 is disposed on the face of the base cloths 58 on the side of the vehicle exterior side wall section 22b on the side of the lower edge 21b of the bag body 21 while the base cloths 58 is flatly developed so that the vehicle interior side wall section 22a and the vehicle exterior side wall section 22b are placed on each other as shown in FIGS. 4A and 4B, the winding core 80 is rotated while the air A is taken in from the intake ports 80a so that the bag body 21 is sucked to the outer peripheral face of the winding core 80, and the base cloths 58 at the portion on the side of the lower edge 21b of the bag body 21 are taken up around the circumference of the winding core 80 (see FIG. 5A). After that, as shown in FIG. 5B, while a slight clearance is formed between the winding core 80 and the bag body 21 (the base cloths 58) by discharging the air A from the intake ports 80, the winding core 80 is extracted, whereby the roll-folded portion 62 can be formed on the lower side of the bellows-folded portion 61, whereby the bag folded body 60 can be formed. At the center of the roll-folded portion 62, a hollow portion H having a volume corresponding to that of the winding core 80 is generated as shown in FIG. 6A.

In the bag folded body 60, the area of the secondary development area (the end side inflation section 39 and the front edge section 32a) 27 serving as the compression section 74 and including the connecting member 55 is used as the planned compression area 68 as described above. The planned compression area 68 is subjected to heating compression processing using the bag heating compressor 85 shown in FIG. 6B. First, as shown in FIGS. 6A and 6B, the planned compression area 68 of the bag folded body 60 is pushed into the concave section 87 of the fixed mold 86 of the bag heating compressor 85. At this time, since the dimension B1 of the opening between both the side faces 89 and 90 of the concave section 87 of the fixed mold 86 is set smaller than the outside dimension (width dimension) D1 of the bag folded body 60 in the left-right direction while the bellows-folded portion 61 is not bent such that the folding lines L1 and L2 are warped upward, the bag folded body 60 being pushed into the concave section 87 is accommodated inside the concave section 87 of the fixed mold 86 while the hollow portion H is slightly crushed in the left-right direction. Furthermore, when the bag folded body 60 is pushed into the concave section 87, the bag folded body 60 is pushed such that the bellows-folded portion 61 is disposed on the side of the concave section 87 away from the bottom face 88 of the concave section 87, that is, on the side of the opening 87a of the concave section 87, and the roll-folded portion 62 is made contact with the bottom face 88 and both the side faces 89 and 90.

Figures 6A, 6B, 6C:
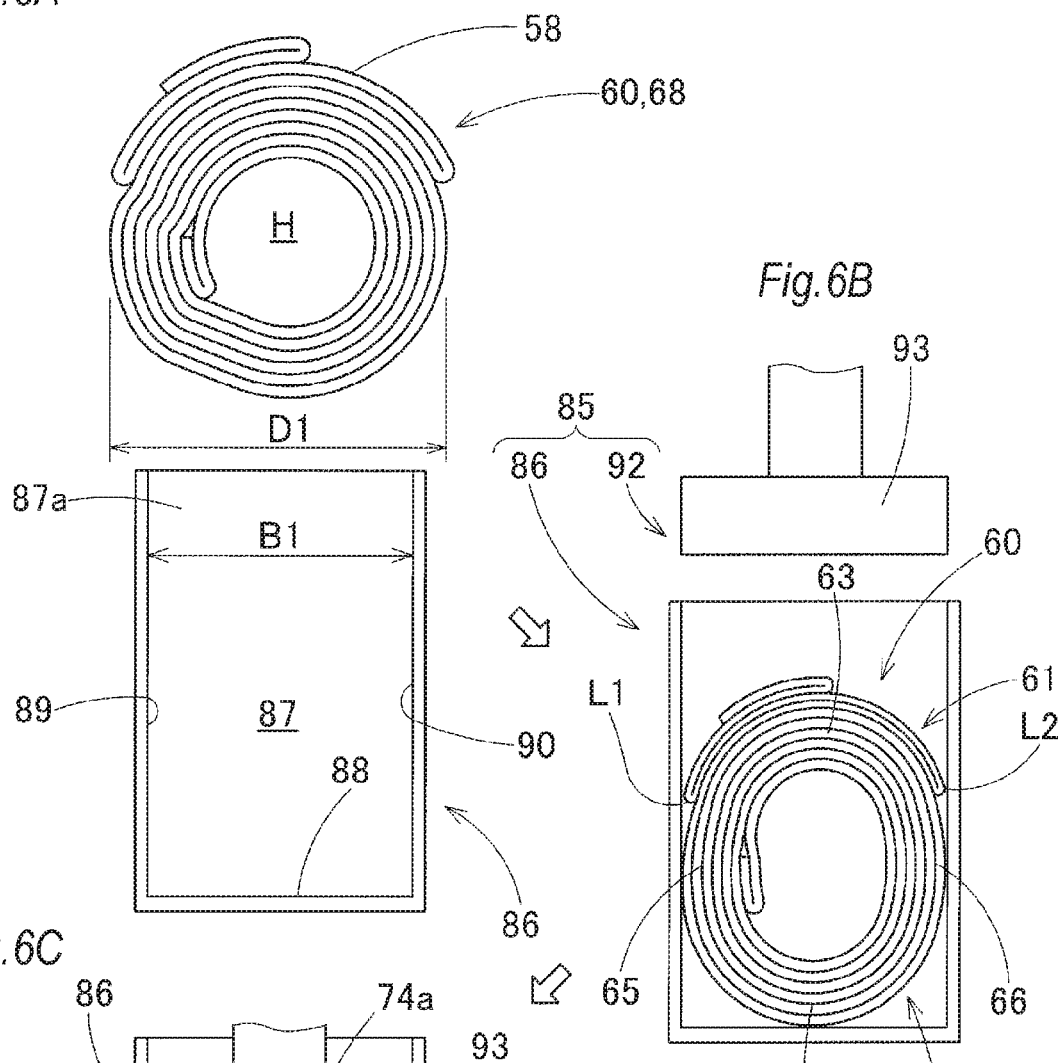
FIGS. 6A to 6C are schematic views illustrating a process for forming the compression section of the folded body according to the embodiment.

After that, as shown in FIGS. 6B and 6C, the pushing plate 93 of the movable mold 92 is inserted into the concave section 87, and the pushing plate 93 is pushed against the bellows-folded portion 61 of the bag folded body 60 from above so that the pushing plate 93 approaches the bottom face 88 to compress the bag folded body 60, and then the bag folded body 60 is heated for a predetermined time using a heater, not shown, to form the compression section 74. At this time, in the planned compression area 68, since the planned compression area 68 is pushed by the pushing plate 93 while being regulated by both the side faces 89 and 90, the bellows-folded portion 61 and the roll-folded portion 62 formed of the laminated upper and lower base cloths 58, that is, an upper laminated section 63 and a lower laminated section 64, are deformed along the pushing plate 93 and the bottom face 88. The side-face side laminated sections 65 and 66 of the roll-folded portion 62 in the left-right direction (the width direction), however, are bent such that the hollow portion H is crushed from the left and right sides while bent sections 65a and 66a approaching each other are provided, whereby the compression section 74 is formed.

Hence, in the compression section 74, while the hollow portion H at the center of the roll-folded portion 62 is crushed, the bent sections 65a and 66a that are formed by bending the respective central areas of the left and right side-face side laminated sections 65 and 66 in the up-down direction are made contact with each other while the state in which the bent sections 65a and 66a are made pressure contact with the upper laminated section 63 and the lower laminated section 64 is maintained, whereby the hollow portion H disappears and the compression section 74 is formed such that the cross-sectional shape thereof in the direction orthogonal to the axis becomes smaller than that before the processing. In the case of the embodiment, the compression section 74 is compressed such that the outside dimensions of the cross section thereof become approximately 70 to 80% of the outside dimensions of the planned compression area 68 before the compression in the up-down direction and the left-right direction. Furthermore, at this heating and compression time, the base cloths 58 (the vehicle interior side wall section 22a and the vehicle exterior side wall section 22b) themselves constituting the bag body 21 are also compressed and become thinner than the base cloths 58 (the vehicle interior side wall section 22a and the vehicle exterior side wall section 22b) constituting the portion of the non-compression section 71 of the folded body 70 that is not subjected to the compression process. Moreover, the bag heating compressor 85 is configured so as to compress the planned compression area 68 of the bag folded body 60 with a predetermined pushing force while the temperature is raised to approximately 100° C.

And then, after the compression section 74 is formed by the bag heating compressor 85, the compression section 74 is cooled using a bag cooling compressor, not shown, while the compressed state of the compression section 74 is maintained so that the restoration of the base cloths 58 to their original shapes is suppressed, whereby the folded body 70 can be formed.

Figure 8A:
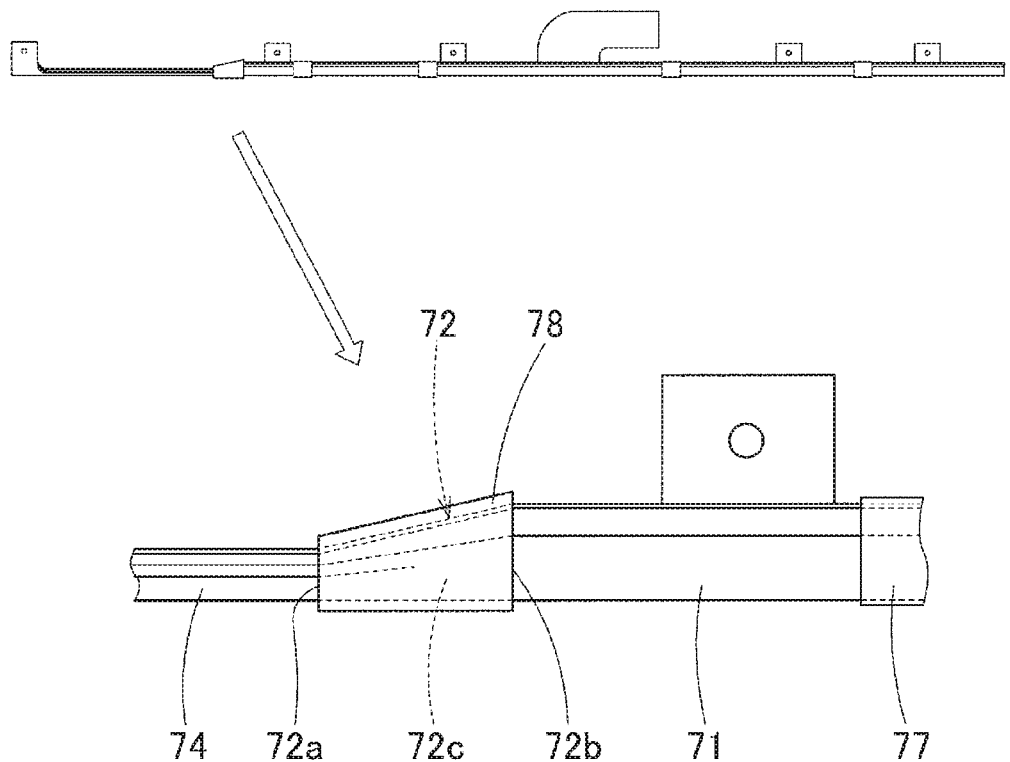
FIGS. 8A and 8B are enlarged front views showing the states in which the cover member is wound around the folded body according to the embodiment.

After the folded body 70 is formed, as shown in FIGS. 7B and 7C, a cover member 78 and folding collapse preventing members 77, each made of a breakable tape material coated with an adhesive on the side of the rear face, are wound at predetermined positions so as to cover the outer peripheral face of the folded body 70. The folding collapse preventing members 77 are wound at a plurality of positions on the folded body 70, and the cover member 78 is wound in the vicinity of the boundary portion 72 between the compression section 74 and the non-compression section 71, not compressed, of the folded body 70. As shown in FIG. 8A, the boundary portion 72 is a portion expanded in diameter in a tapered shape ranging from the compression section 74 having a small cross-sectional shape to the non-compression section 71 having a large cross-sectional shape, and the cover member 78 is wound so as to cover the entire area of the portion.

After that, the inflator 14 having already been provided with the installation bracket 16 is connected to the inflow port section 23 of the airbag 20 using the clamp 15, and the installation brackets 11 are fixed to the respective installation sections 44 and 56, whereby an airbag assembly is formed.

Next, the installation brackets 11 and 16 are disposed at predetermined positions on the inner panel 2 on the side of the body 1 and are fastened with the bolts 12 and 17, lead wires, not shown, extended from a predetermined controller for operating the operation of the inflator are connected to the inflator 14, the front pillar garnish 4 and the roof head lining 5 are installed on the inner panel 2 on the side of the body 1, and the pillar garnishes 6 and 7 are installed on the inner panel 2 on the side of the body 1, whereby the head protection airbag device M can be mounted on the vehicle V.

After the head protection airbag device M is mounted on the vehicle V, if the inflator 14 is operated by receiving an operation signal from the controller at the time of a side collision or a rollover accident of the vehicle V, the inflation gas discharged from the inflator 14 flows into the airbag 20 (the bag body 21), the airbag 20 (the bag body 21) is inflated and breaks the folding collapse preventing members 77 and the cover member 78, and pushes and opens the airbag cover 9 composed of the lower edges 4a and 5a of the front pillar garnish 4 and the roof head lining 5, and then is developed so as to unfold the folding of the airbag while protruding downward, whereby the airbag 20 is inflated significantly so as to cover the vehicle interior side I of the windows W1 and W2, the center pillar section CP and part of the rear pillar section RP as indicated by the two-dot chain line in FIG. 1 and as shown in FIGS. 10A to 10D. FIGS. 11A to 11C and FIGS. 12A to 12C.

Figure 11B:
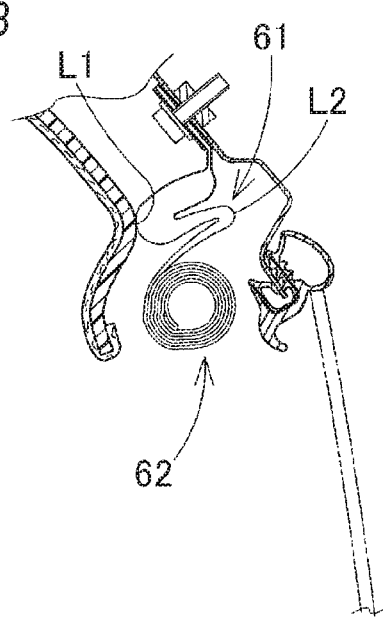
Figure 11C:
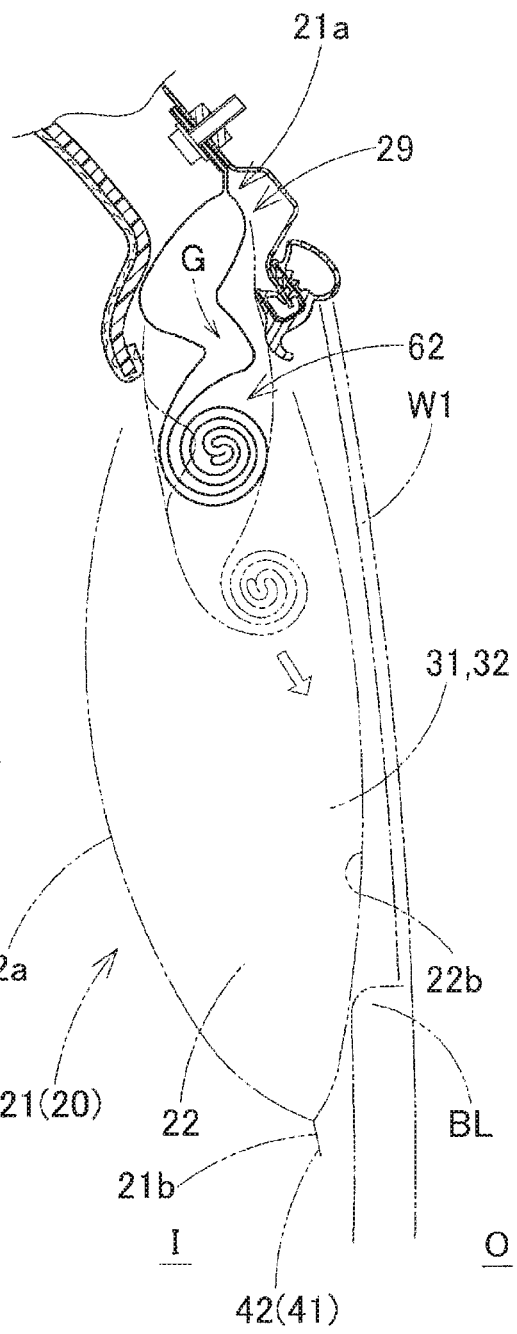
Figure 12A:
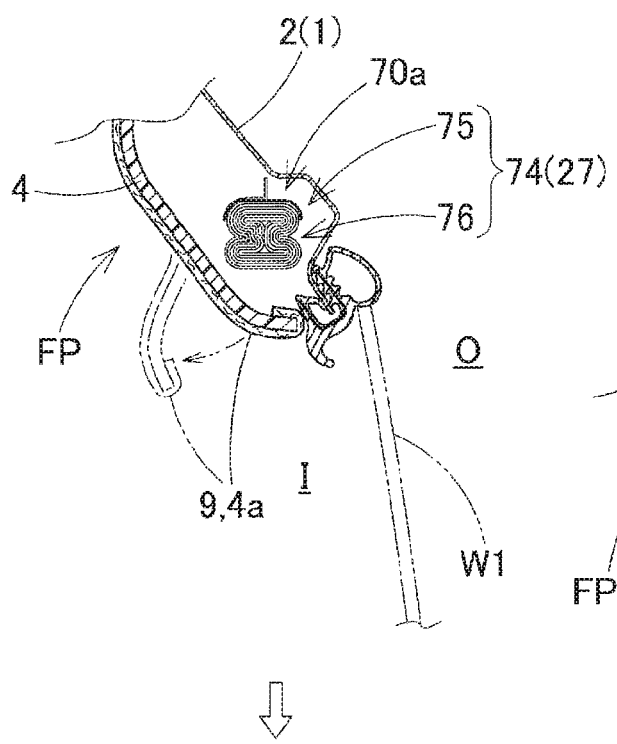
FIGS. 12A to 12C are schematic sectional views sequentially illustrating the operation of the head protection airbag device that uses the folded body according to the embodiment, showing the portion of a secondary development area (compression section)
Figure 12C:
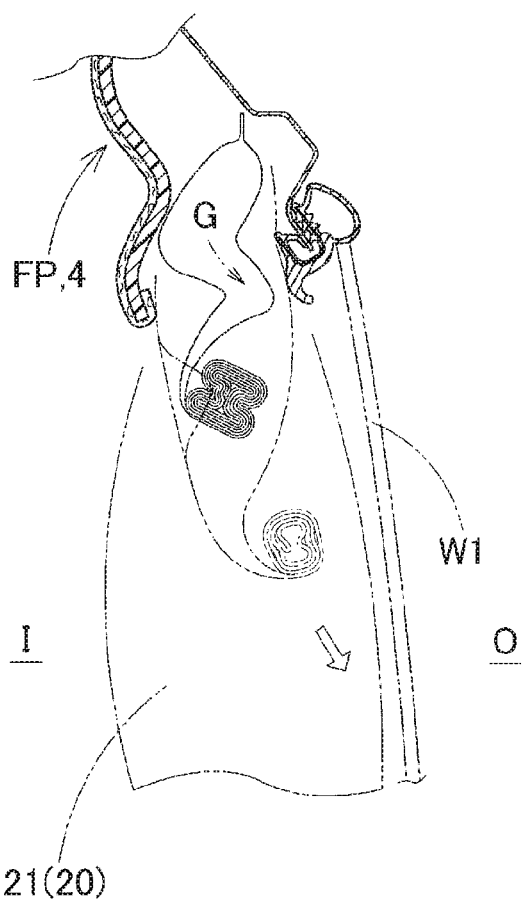
Figure 12B:
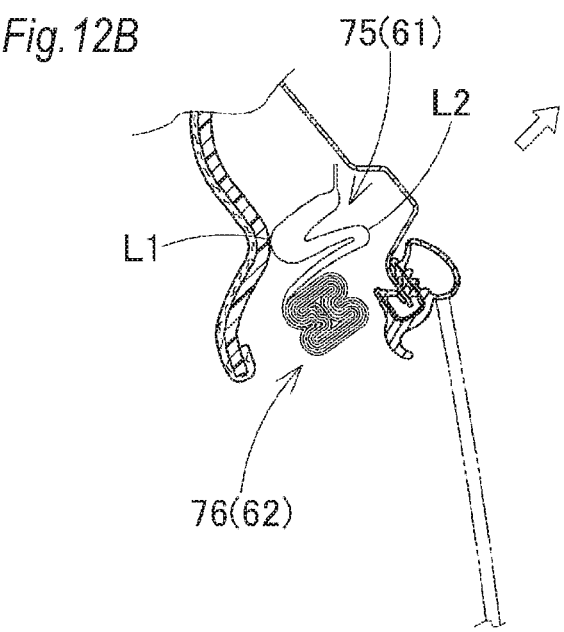

More specifically, in the folded body 70 of the head protection airbag 20 according to the embodiment, the inflation gas G from the inflator 14 flows from the inflow port section 23 into the gas guide passage 29 of the shield inflation section 24. In the primary development area 26 serving as the non-compression section 71, as shown in FIGS. 11A to 11C, the inflation gas G flows on both the front and rear sides in the gas guide passage 29 while unfolding the folding along the folding lines L1 and L2 on the bellows-folded portion 61, flows to the supply ports 31a and 35a, flows from the supply ports 31a and 35a to the protection inflation sections 32 and 36 of the inflation body sections 31 and 35, and unfolds the roll-folding of the roll-folded portion 62, and then makes the side of the lower edge 21b of the bag body 21 stable in the development direction, that is, in the direction along the windows W1 and W2, whereby the shield inflation section 24 can be developed and inflated as a developing behavior so as to perform development and inflation without protruding the side of the lower edge 21b toward the vehicle interior side I, that is, while the side of the lower edge 21b is brought close to the windows W1 and W2, and also as a developing behavior that hardly interferes with the occupants. On the other hand, in the secondary development area 27 serving as the compression section 74, as shown in FIGS. 12A, 12B and 12C, although an attempt is made to perform development and inflation by unfolding the folding of the folding lines L1 and L2 on the bellows-folded portion 61 and by unfolding the roll-folding of the roll-folded portion 62, since the secondary development area 27 is used as the compression section 74, the secondary development area 27 is developed and inflated later than the primary development area 26 by following the development and inflation of the primary development area 26 as shown in FIGS. 10A, 10B and 10C. However, although the secondary development area 27 is developed and inflated later than the primary development area 26, the roll-folding of the primary development area 26 for widely covering the windows W1 and W2 has already been unfolded by the predetermined development behavior, whereby the primary development area 26 can quickly receive and protect the heads of the occupants approaching the windows W1 and W2.

In other words, in the folded body 70 according to the embodiment, the primary development area 26 in the shield inflation section 24 is disposed in the non-compression section 71, and the secondary development area 27 capable of being developed by following the development and inflation of the primary development area 26 is disposed in the compression section 74. Hence, the primary development area 26 for determining the development behavior, such as the development direction, at the inflation time of the head protection airbag 20, is not disposed in the compression section 74 but is disposed in the non-compression section 71, whereby no hindrance occurs in the development and inflation of the head protection airbag 20. Furthermore, since the compression section 74 is configured so as to have a small cross-sectional shape after being folded, the compression section 74 can be stored compact, thereby contributing to making the folded body 70 compact.

Consequently, in the folded body 70 of the head protection airbag 20 according to the embodiment, the compression section 74 that can be stored compact can be disposed while suppressing the influence on the development state of the airbag.

Furthermore, in the embodiment, the shield inflation section 24 has the plurality of inflation body sections 31 and 35 arranged along the front-rear direction and the gas guide passage 29 disposed above the inflation body sections 31 and 35 on the upper edge side of the shield inflation section 24, communicating with the inflow port section 23 from which the inflation gas G is made to flow into the airbag 20 and being capable of guiding the inflation gas G having been made to flow from the inflow port section 23 to the plurality of inflation body sections 31 and 35. Moreover, the secondary development area 27 is disposed on the side of the front end section 31b of the inflation body section 31 in the gas guide passage 29, that is, on the end section side thereof in the front-rear direction beyond the supply port 31a for supplying the inflation gas G to the inflation body section 31.

Hence, in the embodiment, the portion on the side of the front end section 31b of the inflation body section 31 in the gas guide passage 29 in the front-rear direction beyond the supply port 31a for supplying the inflation gas G to the inflation body section 31 becomes the secondary development area 27, and the portion becomes the compression section 74. The other portion, that is, the portion ranging from the gas guide passage 29 to the vicinity of the supply port 31a for supplying the inflation gas G to the inflation body section 31 in the gas guide passage 29 can be set as the primary development area 26 serving as the non-compression section 71. Therefore, when the inflation gas G flows into the folded body 70, the inflation gas G first flows to the gas guide passage 29 via the inflow port section 23 and then flows from the gas guide passage 29 into the respective inflation body sections 31 and 35 via the supply ports 31a and 35a, whereby the airbag 20 is developed and inflated. However, since the compression section 74 is not disposed in the vicinity of the supply ports 31a and 35a of the inflation body sections 31 and 35, the inflation gas G is allowed to flow smoothly from the supply ports 31a and 35a to the protection inflation sections 32 and 36 of the respective inflation body sections 31 and 35, whereby the protection inflation sections 32 and 36 can be developed and inflated to the side of the lower edge 21b and the protection inflation sections 32 and 36 can quickly cover the vehicle interior sides of the windows W1 and W2 while the development direction is made stable along the windows W1 and W2. Furthermore, the secondary development area 27 is formed of the compression section 74, and although the compression section 74 is difficult to be developed and inflated quickly due to the resistance at the time when the compressed portion is extended in comparison with the primary development area 26 formed of the non-compression section 71, the compression section 74 can complete the development and inflation while the compressed folding is unfolded by following the development and inflation of the primary development area 26 (see FIGS. 10A to 10D). Hence, with the folded body 70 configured as described above, when the inflation gas G flows thereinto, the primary development area 26 can be developed and inflated quickly to the side of the lower edge 21b while the direction of the development is made stable, and can accurately cover the vehicle interior side I of the windows W1 and W2. Furthermore, even in the case that the secondary development area 27 formed of the compression section 74 that can be stored compact is disposed on the side of the front end section 70a serving as the end section side in the front-rear direction, the secondary development area 27 can be developed and inflated smoothly by following the development of the area ranging to the side of the lower edge 21b of the protection inflation sections 32 and 36 of the inflation body sections 31 and 35 in the primary development area 26.

In particular, in the embodiment, on the side of the front end section 31b serving as the end section side of the inflation body section 31 in the front-rear direction beyond the supply port 31a for supplying the inflation gas G to the inflation body section 31 in the gas guide passage 29, the throttle section (the gas flow changing throttle section: the upper end 51a of the end side partition section 51) 52 that is formed so as to partially join the vehicle interior side wall section 22a and the vehicle exterior side wall section 22b of the inflation body section 31 and to change the flow of the inflation gas G flowing to the side of the front end section 31b of the inflation body section 31 is disposed. Furthermore, the secondary development area 27 is disposed in the area ranging from the gas flow changing throttle section 52 to the side of the front end section 31b of the inflation body section 31 with the gas flow changing throttle section 52 used as the boundary portion 72 between the primary development area 26 and the secondary development area 27.

Hence, in the embodiment, in the case that the gas flow changing throttle section 52 for changing the flow of the inflation gas G is disposed on the side of the front end section 31b beyond the supply port 31a for supplying the inflation gas G to the inflation body section 31, the throttle section 52 interferes with the flow of the inflation gas G thereby hindering smooth development and inflation of the airbag 20. However, the portion (protection inflation section) 32 of the inflation body section 31 ranging from the supply port 31a to the throttle section 52 becomes the primary development area 26 and serves as the non-compression section 71 instead of the compression section 74, whereby the protection inflation section 32 can be developed and inflated smoothly to the side of the lower edge 21b by making the inflation gas G flow thereinto, the development direction of the airbag 20 is made stable, and the portion can quickly cover the vehicle interior side I of the window W1 (see FIGS. 10A to 10D and FIGS. 11A to 11C). Furthermore, in the case that the throttle section 52 is disposed partially in the inflation body section 31, the inflation body section 31 can be inflated in a thin plate shape without being inflated thickly at the time of the inflation, whereby, even if the clearance between the head of the occupant and the window W1 is small, the inflation body section 31 can be made to enter between the head of the occupant and the window W1, and the inflation can be completed. For this reason, in the configuration described above, even in the case that the portion ranging from the throttle section 52 to the side of the front end section 31b of the inflation body section 31 is used as the compression section 74 capable of being stored compact and serving as the secondary development area 27, the portion (protection inflation section) 32 for making the development and inflation stable at the initial stage of the inflation can be set as the primary development area 26 ranging from the supply port 31a to the throttle section 52 wherein the flow of the inflation gas G is substantially smooth, and the primary development area 26 can be suppressed from being inflated thickly and can smoothly cover the vehicle interior side of the window W1.

What's more, the shield inflation section 24 is provided with the end side inflation section 39 that is adjacent to the main protection inflation section 32 of the inflation body section 31 on the side of the front end 21c, that is, on one end side in the front-rear direction and is partitioned from the protection inflation section 32 by the partition section 51 extending in the up-down direction. The partition section 51 is disposed so as to be provided with an inflow port 39a through which the inflation gas G from the protection inflation section 32 can flow into the end side inflation section 39. In addition, with the partition section 51 used as the boundary portion 72 between the primary development area 26 and the secondary development area 27, the secondary development area 27 is disposed in the portion ranging from the partition section 51 to the side of the front end section 31b, that is, the end section side of the inflation body section 31.

Hence, in the embodiment, the entire area of the end side inflation section 39 including the portion of the inflow port 39 becomes the secondary development area 27 serving as the compression section 74, and the primary development area 26 serving as the non-compression section 71 includes the end side inflation section 39, the protection inflation section 32 and the auxiliary inflation section 33 of the inflation body section 31 partitioned by the partition section 51, the gas guide passage 29, and furthermore the inflation body section 35 on the rear side in the embodiment. Hence, at the time when the inflation gas G flows into the airbag 20, the protection inflation section 32 of the inflation body section 31 and the inflation body section 35 are developed and inflated quickly to the side of the lower edge 21 and can cover the vehicle interior side I of the windows W1 and W2 (see FIGS. 10A to 10D and FIGS. 11A to 11C). After that, the end side inflation section 39 of the secondary development area 27 serving as the compression section 74 is developed by following the development of the primary development area 26 and is inflated by making the inflation gas G flow from the inflow port 39. In other words, in the case that the protection inflation section 32 of the inflation body section 31 is disposed at the portion close to the side of the head of the occupant and that the end side inflation section 39, being hard to be developed and inflated quickly and having a configuration in which the compression section 74 is disposed on the side of the front end section 31b away from the head of the occupant in the front-rear direction so that the compression section 74 is inflated by making the inflation gas G flow from the inflow port 39 having a narrow opening throttled by the partition section 51 thereinto, is disposed, the protection inflation section 32 of the inflation body section 31 in the vicinity of the side of the head of the occupant is developed and inflated and the head of the occupant can be quickly received by the protection inflation section 32 at the initial stage of the development and inflation of the airbag 20, and in the case that the head of the occupant moves obliquely in the front-rear direction, the head of the occupant can be received by the end side inflation section 39 that is developed and inflated after the development and inflation of the protection inflation section 32 of the inflation body section 31. Furthermore, at the initial stage of the development and inflation, because of the delay of the development and inflation of the end side inflation section 39 of the secondary development area 27, the inflation gas G that is supposed to flow toward the secondary development area 27 can be supplied to the primary development area 26 instead of being supplied to the secondary development area 27; as a result, the inflation gas G to be supplied to the protection inflation section 32 of the inflation body section 31 and the inflation body section 35 can be securely obtained abundantly, thereby contributing to quick completion of the development and inflation of the protection inflation sections 32 and 36 of the inflation body sections 31 and 35.

Moreover, in the embodiment, in the vicinity of the boundary portion 72 between the compression section 74 and the non-compression section 71, not compressed, of the folded body 70, the cover member 78 for covering the outer peripheral face 72c of the boundary portion 72 is wound.

Figure 9A:
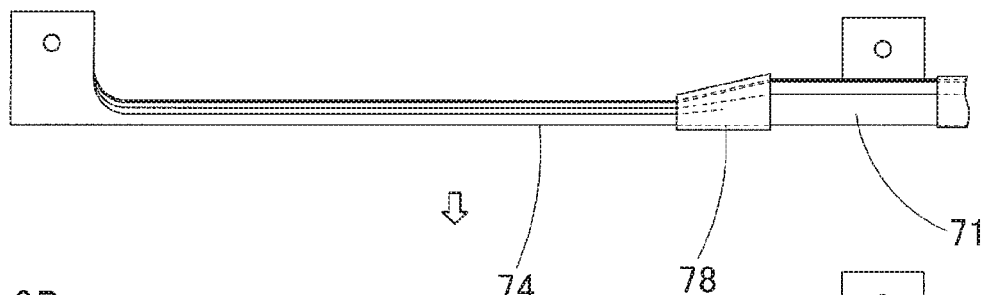
FIGS. 9A to 9D are views illustrating the states in which the folded body according to the embodiment is bent and then restored.
Figure 9B:
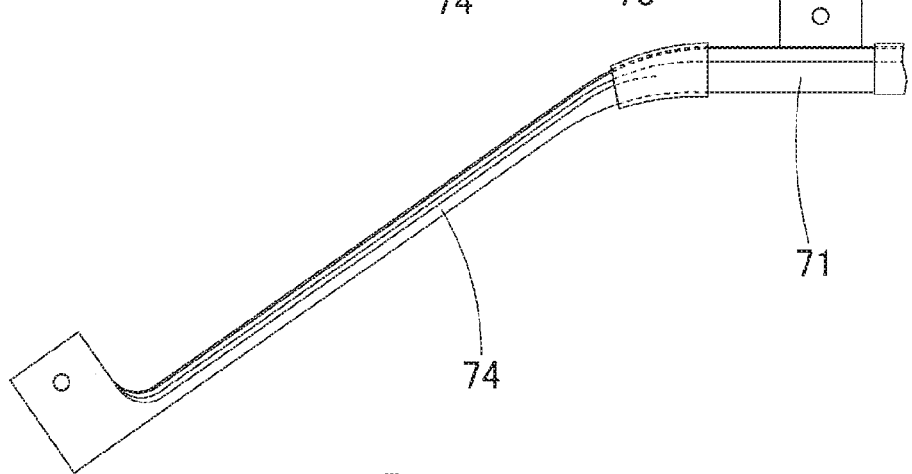
Figure 9C:
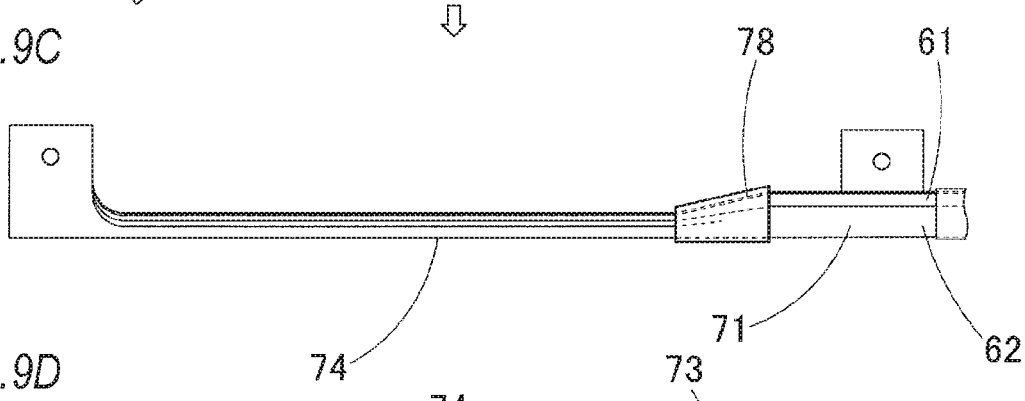
Figure 9D:
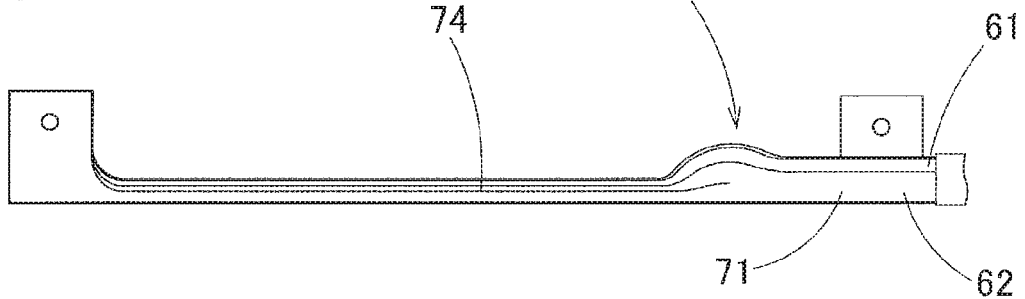

Hence, in the embodiment, the cross-sectional shape of the folded body 70 is small at the compression section 74 and large at the non-compression section 71 and is expanded in a tapered shape toward the non-compression section 71 at the boundary portion 72 between the compression section 74 and the non-compression section 71. For example, when the folded body 70 is carried, as shown in FIGS. 9A to 9C, the folded body 70 is carried in a state of being bent, and then the folded body 70 having been bent is straightened when it is mounted on a vehicle. In the case that the cover member 78 is not provided, as shown in FIG. 9D, the laminated portion of the folded base cloths 58 in which the bellows-folded portion 61 and the roll-folded portion 62 at the bent portion are folded and laminated is not restored due to, for example, frictional resistance, and a swell 73 occurs in the vicinity of the boundary portion 72, whereby the folded body 70 becomes difficult to be mounted on the vehicle V. However, in the case that the cover member 78 for covering the outer peripheral face 72c is wound in the vicinity of the boundary portion 72, the swelling state can be regulated, and even if the folded body 70 having been bent is unbent, the folded body 70 can be restored smoothly to its original state before the bending as shown in FIGS. 9A to 9C, and no problem occurs, for example, when the folded body 70 is mounted on the vehicle thereafter.

Figure 8B:
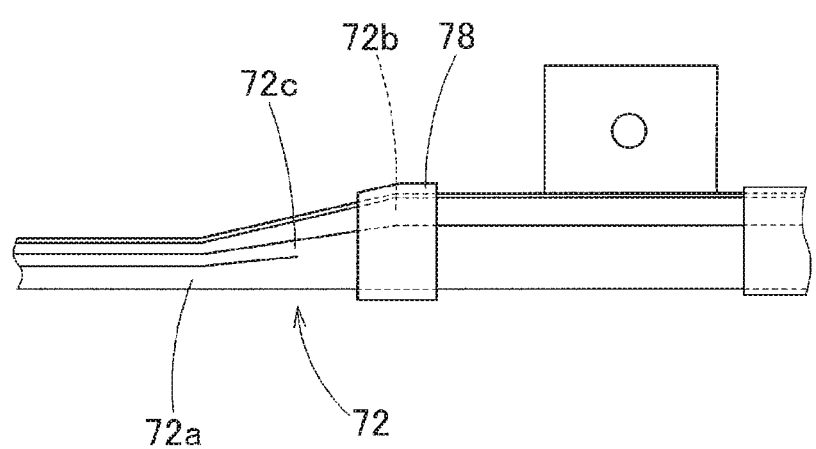

The cover member 78 may be wound so as to cover the entire outer peripheral face 72c ranging from the small-diameter side end section 72a on the side of the compression section 74 to the large-diameter side end section 72b on the side of the non-compression section 71 in the tapered boundary portion 72 as shown in FIG. 8A or may be wound on the side of the large-diameter side end section 72b instead of the side of the small-diameter side end section 72a as shown in FIG. 8B. Furthermore, in the case that the swell 73 can be prevented from occurring, the cover member 78 may be wound around the non-compression section 71 in the vicinity of the large-diameter side end section 72b.

Moreover, in the embodiment, the compression section 74 is disposed in the front end section 70a of the folded body 70 that is stored inside the front pillar section FP on the front edge side of the window W1 of the vehicle V.

Hence, in the embodiment, even if the space inside the front pillar section FP of the vehicle V is small, the compression section 74 being made small in cross-sectional shape at the front end section 70a of the folded body 70 can be disposed smoothly inside the front pillar section FP.

Although the case in which the compression section 74 is provided in the front end section 70a of the folded body 70 has been described in the embodiment, a compression section 74A may be disposed additionally in the rear end section 74b thereof having been set as the secondary development area 27 as in the folded body 70A shown in FIGS. 13B and 13C. This compression section 74A is disposed on the side of the rear end 21d of the airbag 20 beyond the supply port 35a of the inflation body section 35 so that no problem occurs in the development and inflation of the inflation body section 35 on the rear side of the primary development area 26. The folded body 70A described above can be configured more compact because the areas of the compression sections 74 and 74A are increased.

Furthermore, although the case in which the compression section 74 is formed in the secondary development area 27 of the airbag 20 using the bag heating compressor 85 has been described in the embodiment, a compression section 74B may be formed using a compression material 95, such as a heat-shrinkable tube, the inside diameter of which is reduced when heated, as shown in FIGS. 14B and 14C. In this folded body 70B, the compression section 74B can be formed, after the bag folded body 60 is formed, by covering the planned compression area 68 with the compression material 95 and by heating the compression material 95 so as to make the compression material shrink. Although the compression material 95 having shrunk remains covering the folded body 70B, no problem occurs because the compression material 95 is broken together with the cover member 78 and the folding collapse preventing members 77 when the airbag 20 is developed and inflated.

What's more, as shown in FIG. 6C, the compression section 74 according to the embodiment is configured such that a bellows-shaped compression section 75 formed by crushing the bellows-folded portion 61 provided with the folding lines L1 and L2 is provided on the side of the upper face 74a of the compression section 74 and a roll-shaped compression section 76 formed by crushing the roll-folded portion 62 is provided directly under the bellows-shaped compression section 75. The bellows-shaped compression section 75 serving as an upstream portion from which the inflation gas flows is not provided with dent portions but is simply compressed in the up-down direction while the folding lines L1 and L2 of the bellows-folded portion 61 are stacked thereon. Hence, when the compression section 74 is developed and inflated, the bellows-shaped compression section 75 formed of the bellows-folded portion 61 on the upstream side from which the inflation gas flows is inflated so as to unfold the folding lines L1 and L2 and can push out the roll-shaped compression section 76 downward smoothly while the development direction thereof is made stable along the window W1 as shown in FIGS. 12A and 12B.

Still further, in the roll-shaped compression section 76 composed of the pushed-out roll-folded portion 62, the hollow portion H at the center of the roll-folded portion 62 is crushed in the up-down direction and the left-right direction, particularly in the left-right direction; that is to say, the hollow portion H is crushed in the up-down direction by the upper laminated section 63 and the lower laminated section 64 respectively located on the upper side and the lower side, and the bent sections 65a and 66a of the left and right side-face side laminated sections 65 and 66 respectively located on the left side and the right side enter the hollow portion H so as to eliminate the hollow portion H, whereby the roll-shaped compression section 76 is formed into a nearly quadrangular pillar (nearly equilateral quadrangular pillar) in which the hollow portion H is eliminated. Hence, when the roll-shaped compression section 76 is unfolded and inflated, the roll-folding thereof is unfolded like being unwound by making the inflation gas G flow into the portions of the gas inflow section 22 (the end side inflation section 39) on the sides of the outer surfaces in the upper laminated section 63, the side-face side laminated section 65 having the bent section 65a, the lower laminated section 64, and the side-face side laminated section 66 having the bent section 66a, whereby the roll-shaped compression section 76 is developed and inflated to the side of the lower edge 21. Consequently, the rotation of the roll-shaped compression section 76 at the time when the folding is unfolded is performed smoothly and the folding is unfolded because the rotation radiuses of the respective portions from the rotation center can be made nearly uniform without being made variable significantly by forming the roll-shaped compression section 76 into the nearly quadrangular pillar (nearly equilateral quadrangular pillar). As a result, on the basis of the pushing-out direction along the window W1 at the time when the folding of the bellows-shaped compression section 75 is unfolded, the roll-shaped compression section 76 is brought to the state in which the roll-folding is unfolded while approaching the window W1, and the compression section 74 can be developed and inflated while the protrusion toward the vehicle interior side I is suppressed and the direction of the development is made stable to the side of the lower edge 21.

In the case that the compression section 74 has the upper laminated section 63, the lower laminated section 64 and the left and right side-face side laminated sections 65 and 66 provided with the bent sections 65a and 66a and that the hollow portion H has disappeared, the cross-sectional shape of the compression section 74 can be formed into a circular shape including an oval or elliptical shape or a semicircular shape so as to be made to correspond to the shapes of the concave section 87 of the fixed mold 86 of the bag heating compressor 85 and the pushing plate 93 of the movable mold 92, instead of the nearly rectangular shape as in the embodiment. Even in such cases, the rotation of the roll-shaped compression section 76 at the time when the folding is unfolded can also be made nearly uniform without causing large variations in the rotation radius from the center of the rotation at the respective portions, whereby the roll-shaped compression section 76 can be rotated smoothly and the folding thereof can be unfolded.

In the case that the above-mentioned point is not considered, the form of the compression of the compression section is not limited to that according to the embodiment as a matter of course, but the form may merely be required to be smaller than the non-compression section 71 in cross-sectional shape with the hollow portion H in the roll-folded portion 62 crushed.

Furthermore, in the embodiment, in the folding process for bringing the side of the lower edge 21b of the airbag 20 close to the side of the upper edge 21a thereof, the airbag is folded by performing roll-folding so that the airbag is rolled toward the vehicle exterior side and by performing bellows-folding so as to reduce the width dimension in the up-down direction. However, the process is not limited to that according to the embodiment, provided that the airbag 20 is folded so that the side of the lower edge 21 can be brought close to the side of the upper edge 21a. It may be possible to use a configuration in which the airbag is folded by performing bellows-folding over the entire area in the up-down direction.

Moreover, in the embodiment, as shown in FIG. 15, the area in the vicinity of the upper end 51a of the end side partition section 51 is used as the boundary portion 72, and the area ranging from the boundary portion 72 to the side of the front end section 31b serving as the end section side of the inflation body section 31 is used as the secondary development area 27 serving as the compression section 74. However, in the case that the protection inflation section 32 of the inflation body section 31 can quickly cover the window W1, the position on the rear side away from the upper end 51a of the end side partition section 51 and away forward from the supply port 31a may be used as a boundary portion 72C as indicated by the two-dot chain line in FIG. 15, and the area ranging from the boundary portion 72C to the side of the front end section 31b (the side of the front end 21c of the shield inflation section 24) of the inflation body section 31 may be used as the secondary development area 27 (the planned compression area 68) serving as the compression section 74.

Figure 16:
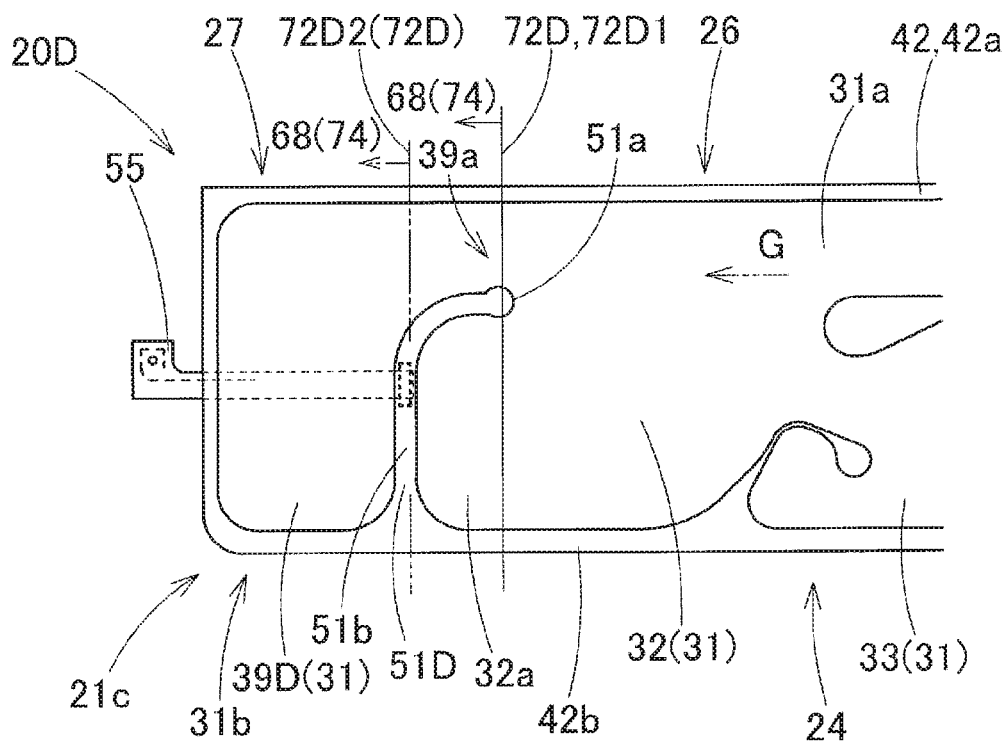
FIG. 16 is a view illustrating the boundary portion between the primary development area and the secondary development area of the airbag according to a modification of the embodiment.

What's more, as in the airbag 20D shown in FIG. 16, an end side inflation section 39D may be provided by extending the upper end 51a of an end side partition section 51D rearward to the vicinity of the disposition position of the boundary portion 72C described above. In this airbag 20D, as the boundary portion 72D between the primary development area 26 and the secondary development area 27, a boundary portion 72D1 may be disposed in the vicinity of the upper end 51a of the end side partition section 51D, and the area ranging from the boundary portion 72D1 to the side of the front end section 31b serving as the end section side of the inflation body section 31 may be used as the secondary development area 27 (the planned compression area 68) serving as the compression section 74, or a boundary portion 72D2 may be disposed in the vicinity of the vertical rod section 51b provided along the up-down direction of the end side partition section 51D, and the area ranging from the boundary portion 72D2 to the side of the front end section 31b serving as the end section side of the inflation body section 31 may be used as the secondary development area 27 (the planned compression area 68) serving as the compression section 74.

Still further, in the embodiment, the end side partition section 51 for partitioning the end side inflation section 39 and the protection inflation section 32 of the inflation body section 31 is provided with the gas flow changing throttle section 52 at the upper end 51a thereof. However, as in each of the airbags 20E and 20 F shown in FIGS. 17 and 18, a gas flow changing throttle section 52E/52F for changing the flow of the inflation gas G flowing to the side of the front end section 31b of the inflation body section 31 may be provided behind away rearward from the end side partition section 51E/51F for partitioning the end side inflation section 39E/39F and the protection inflation section 32 of the inflation body section 31. The throttle sections 52E may also be disposed away from the peripheral edge section 42 so as to extend downward from the upper edge 42a of the peripheral edge section 42.

In each of these airbags 20E and 20F, as the boundary portion 72E/72F between the primary development area 26 and the secondary development area 27, a boundary portion 72E1/72F1 may be disposed in the gas flow changing throttle section 52E/52F, and the area ranging from the boundary portion 72E1/72F1 to the side of the front end section 31*b* serving as the end section side of the inflation body section 31 may be used as the secondary development area 27 (the planned compression area 68) serving as the compression section 74, or a boundary portion 72E2/72F2 may be disposed in the end side partition section 51E/51F, and the area ranging from the boundary portion 72E2/72F2 to the side of the front end section 31*b* serving as the end section side of the inflation body section 31 may be used as the secondary development area 27 (the planned compression area 68) serving as the compression section 74.

Each of the area between the boundary portions 72E1 and 72E2 and the area between the boundary portions 72F1 and 72F2 shown as examples in the figures may also be used as a boundary portion, and the area ranging from the boundary portion to the side of the end section 31*b* serving as the end section side of the inflation body section 31 may also be used as the secondary development area 27 (the planned compression area 68) serving as the compression section 74, as a matter of course.

Figure 17:
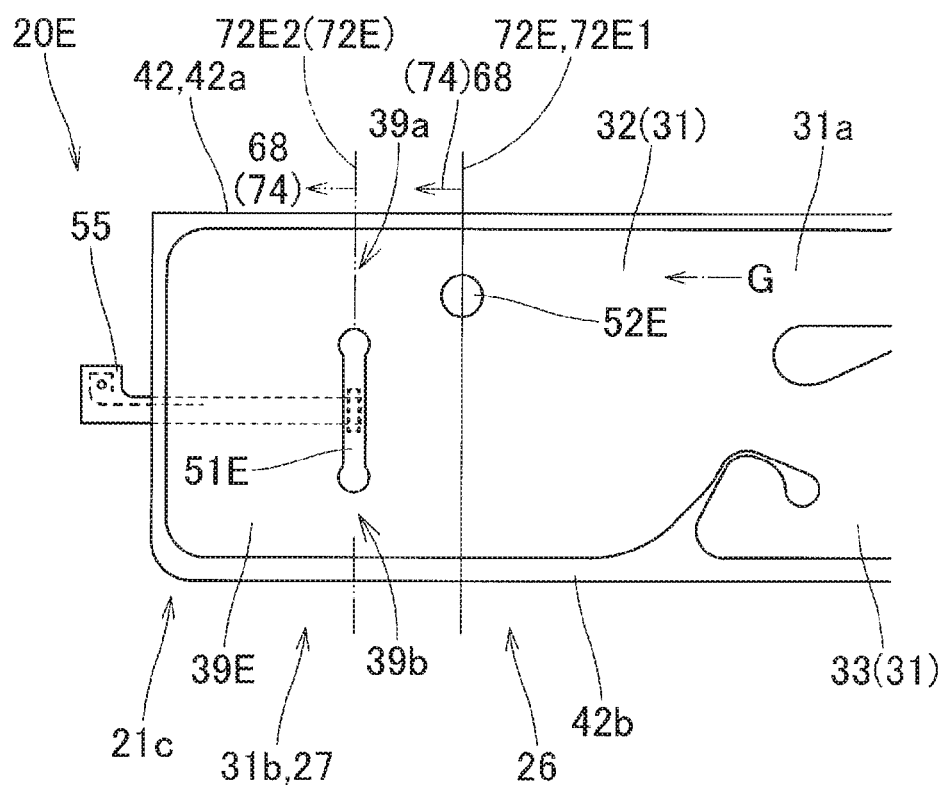
FIG. 17 is a view illustrating the boundary portion between the primary development area and the secondary development area of the airbag according to another modification of the embodiment.
Figure 18:
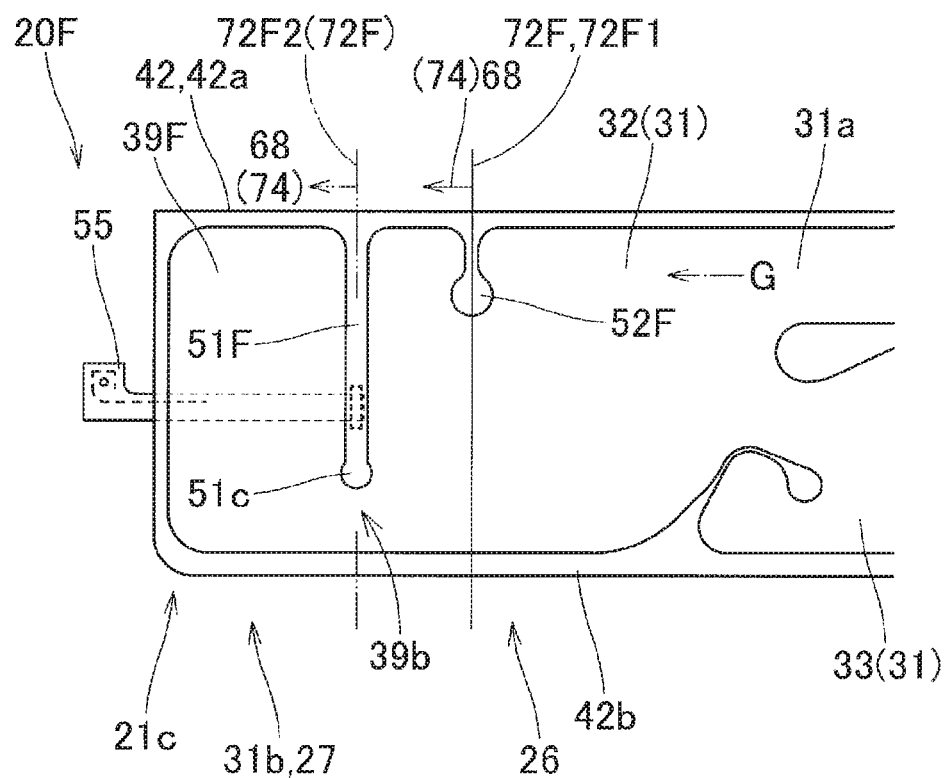
FIG. 18 is a view illustrating the boundary portion between the primary development area and the secondary development area of the airbag according to still another modification of the embodiment.

In the end side inflation section 39/39D/39E/39F partitioned from the protection inflation section 32 by the end side partition section 51/51D/51E/51F, as the inflow port into which the inflation gas from the side of the protection inflation section 32 is made to flow, the inflow port 39*a* disposed on the upper side of the upper end 51*a* of each of the end side partition sections 51 and 51D as in each of the airbag 20 according to the embodiment and the airbag 20D shown in FIG. 16 may be used, or the inflow port 39*b* disposed on the lower side of the upper end 51*c* of the end side partition section 51F shown in FIG. 18 may be used, or the inflow ports 39*a* and 39*b* disposed on both the upper and lower sides of the end side partition section 51F shown in FIG. 17 may also be used. Such an inflow port may also be disposed at the center of the end side partition section in the up-down direction as a matter of course.

According to an aspect of the invention, there is provided a folded body of a head protection airbag, formed by folding the head protection airbag, the airbag being inflatable so as to cover a vehicle interior side of a window of a vehicle by making inflation gas flow thereinto, from a flatly developed state into a nearly rod shape along a front-rear direction so that a lower edge side of the airbag is brought close to an upper edge side thereof and so that the airbag can be stored on an upper edge side of the window, the folded body comprising: a compression section that is disposed on an end section side and that is folded and then compressed so as to have a small cross-sectional shape, and a non-compression section that is disposed so as to continue to the compression section and that is folded but not compressed after being folded, wherein the airbag includes a shield inflation section that covers the vehicle interior side of the window at a time of inflation completion, the shield inflation section includes: a primary development area that is developed and inflated in an initial stage of an inflow of the inflation gas; and a secondary development area that is disposed on a side of one end of the airbag in the front-rear direction so as to be inflatable by following development and inflation of the primary development area, and the secondary development area is disposed in the compression section and the primary development area is disposed in the non-compression section.

In the folded body of the head protection airbag according to the present invention, the primary development area in the shield inflation section is disposed in the non-compression section, and the secondary development area capable of being developed by following the development and inflation of the primary development area is disposed in the compression section. In other words, the primary development area for determining the development behavior, such as the development direction, at the inflation time of the head protection airbag, is not disposed in the compression section but is disposed in the non-compression section, whereby no hindrance occurs in the development and inflation of the head protection airbag. Furthermore, since the compression section is configured so as to have a small cross-sectional shape after being folded, the compression section can be stored compact, thereby contributing to making the folded body compact.

Consequently, in the folded body of the head protection airbag according to the present invention, the compression section that can be stored compact can be disposed while suppressing the influence on the development state of the airbag.

The shield inflation section may include: a plurality of inflation body sections that are arranged along the front-rear direction; and a gas guide passage that is disposed above the inflation body sections on an upper edge side of the shield inflation section, that communicates with an inflow port section from which the inflation gas is made to flow into the airbag, and that is capable of guiding the inflation gas having been made to flow from the inflow port section to the plurality of inflation body sections, and the secondary development area may be disposed on a side of an end section in the gas guide passage in the front-rear direction beyond a supply port for supplying the inflation gas to the inflation body section.

With this configuration, the portion on the end section side in the gas guide passage in the front-rear direction beyond the supply port for supplying the inflation gas to the inflation body section becomes the secondary development area, and the portion becomes the compression section. The other portions, that is, the area ranging from the gas guide passage to the vicinity of the supply port for supplying the inflation gas to the inflation body section in the gas guide passage can be set as the primary development area serving as the non-compression section. Therefore, when the inflation gas flows into the folded body, the inflation gas first flows to the gas guide passage via the inflow port section and then flows from the gas guide passage into the respective inflation body sections via the supply ports, whereby the airbag is developed and inflated. However, since the compression section is not disposed in the vicinity of the supply ports of the inflation body sections, the inflation gas is allowed to flow smoothly from the supply ports to the respective inflation body sections, whereby the inflation body sections can be developed and inflated to the lower edge side, the development direction can be made stable, and the inflation body sections can quickly cover the vehicle interior side of the window. Furthermore, the secondary development area is formed of the compression section, and although the compression section is difficult to be developed and inflated quickly due to the resistance at the time when the compressed portion is extended in comparison with the primary development area formed of the non-compression section, the compression section can complete the development and inflation while the compressed folding is unfolded by following the development and inflation of the primary development area. Hence, with the folded body configured as described above, when the inflation gas flows thereinto, the primary development area can be developed and inflated quickly to the lower edge side while the direction of the development is made stable and can accurately cover the vehicle interior side of the window. Furthermore, even in the case that the secondary development area formed of the compression section that can be stored compact is disposed on the end section side in the front-rear direction, the secondary development area can be developed and inflated smoothly by following the development of the area ranging to the lower edge side of the protection inflation sections of the inflation body sections in the primary development area.

On the side of the end section in the gas guide passage in the front-rear direction beyond the supply port for supplying the inflation gas to the inflation body section, a throttle section for changing the flow of the inflation gas flowing to an end section side of the inflation body section may be disposed, and the secondary development area may be disposed in an area ranging from the throttle section to the end section side of the inflation body section with the throttle section used as a boundary portion between the primary development area and the secondary development area.

In this configuration, in the case that the throttle section for changing the flow of the inflation gas is disposed on the end section side beyond the supply port for supplying the inflation gas to the inflation body section, the throttle section interferes with the flow of the inflation gas, thereby hindering smooth development and inflation of the airbag. However, the portion of the inflation body section ranging from the supply port to the throttle section becomes the primary development area and serves as the non-compression section instead of the compression section, whereby the protection inflation section can be developed and inflated smoothly to the lower edge side by making the inflation gas flow thereinto, the development direction of the airbag is made stable, and the portion can quickly cover the vehicle interior sides of the windows. Furthermore, in the case that the throttle section is disposed partially in the inflation body section, the inflation body section can be inflated in a thin plate shape without being inflated thickly at the time of the inflation, whereby, even if the clearance between the head of the occupant and the window is small, the inflation body section can be made to enter between the head of the occupant and the window, and the inflation can be completed. For this reason, in the configuration described above, even in the case that the portion ranging from the throttle section to the end section side of the inflation body section is used as the compression section capable of being stored compact and serving as the secondary development area, the portion for making the development and inflation stable at the initial stage of the inflation can be set as the primary development area ranging from the supply port to the throttle section wherein the flow of the inflation gas is substantially smooth, and the primary development area can be suppressed from being inflated thickly and can smoothly cover the vehicle interior side of the window.

The shield inflation section may include an end side inflation section that is adjacent to a main protection inflation section of the inflation body section on one end side in the front-rear direction and that is partitioned from the protection inflation section by a partition section extending in an up-down direction, the partition section may be disposed so as to be provided with an inflow port through which the inflation gas from the protection inflation section can flow into the end side inflation section, and the secondary development area may be disposed in an area ranging from the partition section to the end section side of the inflation body section with the partition section used as a boundary portion between the primary development area and the secondary development area.

In the configuration described above, the entire area of the end side inflation section including the portion of the inflow port becomes the secondary development area serving as the compression section, and the primary development area serving as the non-compression section includes the end side inflation section, the protection inflation section of the inflation body section partitioned by the partition section and the gas guide passage. Hence, at the time when the inflation gas flows into the airbag, the protection inflation section of the inflation body section is developed and inflated quickly to the lower edge side and can cover the vehicle interior side of the window. After that, the end side inflation section of the secondary development area serving as the compression section is developed by following the development of the primary development area and is inflated by making the inflation gas flow from the inflow port. In other words, in the case that the protection inflation section of the inflation body section is disposed at the portion close to the side of the head of the occupant and that the end side inflation section, being hard to be developed and inflated quickly and having a configuration in which the compression section is disposed on the end section side away from the head of the occupant in the front-rear direction so that the compression section is inflated by making the inflation gas flow from the inflow port having a narrow opening throttled by the partition section thereinto, is disposed, the protection inflation section of the inflation body section near the side of the head of the occupant is developed and inflated and the head of the occupant can be quickly received by the protection inflation section of the inflation body section at the initial stage of the development and inflation of the airbag, and in the case that the head of the occupant moves obliquely in the front-rear direction, the head of the occupant can be received by the end side inflation section of the inflation body section that is developed and inflated after the development and inflation of the protection inflation section of the inflation body section. Furthermore, at the initial stage of the development and inflation, because of the delay of the development and inflation of the end side inflation section of the secondary development area, the inflation gas that is supposed to flow toward the secondary development area can be supplied to the primary development area instead of being supplied to the secondary development area as a result, the inflation gas to be supplied to the protection inflation section of the inflation body section can be securely obtained abundantly, thereby contributing to quick completion of the development and inflation of the protection inflation section of the inflation body section.

In a vicinity of a boundary portion between the compression section and the non-compression section, a cover member for covering an outer peripheral face may be wound.

In the configuration described above, the cross-sectional shape of the folded body is small at the compression section and large at the non-compression section and is expanded in a tapered shape toward the non-compression section from the compression section at the boundary portion between the compression section and the non-compression section. In the case that the cover member is not provided, when the folded body is carried, the folded body is carried in a state of being bent, and then the folded body having been bent is straightened when it is mounted on a vehicle, the bent portion in the vicinity of the boundary portion is not restored due to, for example, frictional resistance caused by the mutual friction between the folded and laminated portions, and a swell occurs in the vicinity of the boundary portion, whereby the folded body becomes difficult to be mounted on the vehicle. However, in the case that the cover member for covering the outer peripheral face is wound in the vicinity of the boundary portion, the swelling state can be regulated, and even if the folded body having been bent is unbent, the folded body can be restored smoothly to its original state before the bending, and no problem occurs, for example, when the folded body is mounted on the vehicle thereafter.

The compression section may be disposed in a front end section of the folded body which is stored inside a front pillar section on a front edge side of the window of the vehicle.

In the configuration described above, even if the space inside the front pillar section of the vehicle is small, the compression section being reduced in cross-sectional shape at the front end section of the folded body can be disposed smoothly inside the front pillar section.

Still further, the compression sections may be disposed on both the front and rear ends of the folded body, and with this configuration, the folded body can be configured more compact because the areas of the compression sections are increased.

What is claimed is:

1. A folded body of a head protection airbag, formed by folding the head protection airbag, the airbag being inflatable so as to cover a vehicle interior side of a window of a vehicle by making inflation gas flow thereinto, from a flatly developed state into a nearly rod shape along a front-rear direction so that a lower edge side of the airbag is brought close to an upper edge side thereof and so that the airbag can be stored on an upper edge side of the window, the folded body comprising:

a compression section that is disposed on an end section side and that is folded and then compressed so as to have a small cross-sectional shape, and a non-compression section that is disposed so as to continue to the compression section and that is folded but not compressed after being folded, wherein the airbag includes a shield inflation section that covers the vehicle interior side of the window at a time of inflation completion, the shield inflation section includes: a primary development area that is developed and inflated in an initial stage of an inflow of the inflation gas; and a secondary development area that is disposed on a side of one end of the airbag in the front-rear direction so as to be inflatable by following development and inflation of the primary development area, and the secondary development area is disposed in the compression section and the primary development area is disposed in the non-compression section, wherein the shield inflation section includes:

a plurality of inflation body sections that are arranged along the front-rear direction; and a gas guide passage that is disposed above the inflation body sections on an upper edge side of the shield inflation section, that communicates with an inflow port section from which the inflation gas is made to flow into the airbag, and that is capable of guiding the inflation gas having been made to flow from the inflow port section to the plurality of inflation body sections, and the secondary development area is disposed on a side of an end section in the gas guide passage in the front-rear direction beyond a supply port for supplying the inflation gas to the inflation body sections, and wherein the shield inflation section includes an end side inflation section that is adjacent to a main protection inflation section of the inflation body sections on one end side in the front-rear direction and that is partitioned from the main protection inflation section by a partition section extending in an up-down direction, the partition section is disposed so as to be provided with an inflow port through which the inflation gas from the main protection inflation section can flow into the end side inflation section, and the secondary development area is disposed in an area ranging from the partition section to the end section side of the inflation body section with the partition section used as a boundary portion between the primary development area and the secondary development area, wherein the partition section is disposed so as to be provided with the inflow port between an upper end of the partition section which is extended upward while being bent rearward and an upper edge of a peripheral edge section, wherein the upper end of the partition section is the boundary portion between the primary development area and the secondary development area.

2. The folded body of the head protection airbag according to claim 1, wherein, on the side of the end section in the gas guide passage in the front-rear direction beyond the supply port for supplying the inflation gas to the inflation body section, a throttle section for changing the flow of the inflation gas flowing to the end section side of the inflation body section is disposed, and the secondary development area is disposed in an area ranging from the throttle section to the end section side of the inflation body section with the throttle section used as the boundary portion between the primary development area and the secondary development area.

3. The folded body of the head protection airbag according to claim 1, wherein, in a vicinity of a boundary portion between the compression section and the non-compression section, a cover member for covering an outer peripheral face is wound.

4. The folded body of the head protection airbag according to claim 1, wherein the compression section is disposed in a front end section of the folded body which is stored inside a front pillar section on a front edge side of the window of the vehicle.

5. The folded body of the head protection airbag according to claim 1, wherein a plurality of compression sections including the compression section are disposed on both front and rear ends of the folded body.

* * * * *